(12) United States Patent
Eguchi et al.

(10) Patent No.: US 8,928,798 B2
(45) Date of Patent: Jan. 6, 2015

(54) ZOOM LENS AND IMAGE PICKUP APPARATUS INCLUDING THE SAME

(71) Applicant: Canon Kabushiki Kaisha, Tokyo (JP)

(72) Inventors: Yosuke Eguchi, Utsunomiya (JP); Masao Hori, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/958,664

(22) Filed: Aug. 5, 2013

(65) Prior Publication Data

US 2014/0049680 A1 Feb. 20, 2014

(30) Foreign Application Priority Data

Aug. 17, 2012 (JP) ................................ 2012-180896

(51) Int. Cl.
| | |
|---|---|
| *H04N 5/262* | (2006.01) |
| *H04N 5/232* | (2006.01) |
| *G03B 13/00* | (2006.01) |
| *G02B 15/14* | (2006.01) |
| *G02B 15/173* | (2006.01) |

(52) U.S. Cl.
CPC .............. *G02B 15/14* (2013.01); *G02B 15/173* (2013.01)
USPC ......... 348/345; 348/240.3; 359/683; 359/684

(58) Field of Classification Search
USPC ....................... 348/240.3, 345; 359/683, 684
See application file for complete search history.

(56) References Cited

U.S. PATENT DOCUMENTS 5,808,809 A 9/1998 Yahagi

FOREIGN PATENT DOCUMENTS

| JP | 10-031157 A | 2/1998 |
|---|---|---|
| JP | 10-039216 A | 2/1998 |
| JP | 2010191336 A | 9/2010 |

*Primary Examiner* — Joel Fosselman
(74) *Attorney, Agent, or Firm* — Rossi, Kimms & McDowell LLP

(57) ABSTRACT

A zoom lens, including, in order from object side to image side: a positive first lens unit which does not move during zooming; a negative second lens unit for zooming; a positive third lens unit for zooming; a negative fourth lens unit which moves during zooming; and a positive fifth lens unit which does not move during zooming, in which: $0.6<|\beta 3F|<1.0$, $-4.0<f4/f3<-1.0$, and $20<L2w/L3w<300$ are satisfied, where $\beta 3F$ is a lateral magnification of the third lens unit at a position at which a lateral magnification of the second lens unit becomes $-1$; f3 and f4 are respectively focal lengths of the third and fourth lens units; L2w is a gap between the second and third lens units at a wide angle end; and L3w is a gap between the third and fourth lens units at the wide angle end.

8 Claims, 18 Drawing Sheets

ZOOM LENS AND IMAGE PICKUP APPARATUS INCLUDING THE SAME

BACKGROUND OF THE INVENTION

1. Field of the Invention

The present invention relates to a zoom lens and an image pickup apparatus including the zoom lens which are suitable for use in a broadcasting television camera, a video camera, a digital still camera, a monitoring camera, and a silver-halide film camera, for example.

2. Description of the Related Art

In recent years, a zoom lens having a wider angle of view, a high zoom ratio, and high optical performance is required for an image pickup apparatus such as a television camera, a silver-halide film camera, a digital camera, or a video camera. As a zoom lens having a wider angle of view and a high zoom ratio, there is known a positive-lead type five-unit zoom lens constituted of five lens units including a lens unit having a positive refractive power disposed closest to the object side (see Japanese Patent Application Laid-Open Nos. H10-039216, 2010-191336, and H10-031157).

Japanese Patent Application Laid-Open Nos. H10-039216, 2010-191336, and H10-031157 each propose a zoom lens including a first lens unit having a positive refractive power, a second lens unit having a negative refractive power, a third lens unit having the positive refractive power, a fourth lens unit having the negative refractive power, and a fifth lens unit having the positive refractive power for imaging, in which the second, third, and fourth lens units move during zooming.

Japanese Patent Application Laid-Open No. H10-039216 discloses a five-unit zoom lens having a zoom ratio of approximately 5 and a photographing field angle of approximately 43 degrees at a wide angle end. Japanese Patent Application Laid-Open No. 2010-191336 discloses a five-unit zoom lens having a zoom ratio of approximately 3 and a photographing field angle of approximately 34 degrees at the wide angle end. Japanese Patent Application Laid-Open No. H10-031157 discloses a five-unit zoom lens having a zoom ratio of approximately 19 and a photographing field angle of approximately 76 degrees at the wide angle end.

In order to obtain high optical performance while maintaining a wider angle of view and a higher zoom ratio in the five-unit zoom lens, it is important to appropriately set a refractive power, a configuration, and the like of each lens unit. In particular, it is important to appropriately set movement conditions, the refractive power, and the like of each magnification varying lens unit. If these configurations are not appropriately set, it becomes difficult to provide a zoom lens having a wide angle of view, a high zoom ratio, and high optical performance over an entire zoom range.

In particular, the third lens unit having the positive refractive power has had a tendency toward an increase in lens diameter (effective diameter) when an attempt was made to attain a high zoom ratio of about 80 to 130. The increase in lens diameter of the third lens unit, which is a magnification varying lens unit, leads to increased variations in aberrations during zooming. In addition, when the lens diameter of the third lens unit is increased, a center thickness of each lens is generally increased in proportion to the lens diameter for securing an edge thickness and a strength thereof, which leads to a significant increase in weight of the entire third lens unit. As a result, a drive power for zooming is increased, which is disadvantageous in increasing the speed of a zooming operation and in improving operation followability in terms of mechanism, power consumption, and the like, and hence is undesirable.

SUMMARY OF THE INVENTION

The present invention provides a zoom lens having a wide angle of field at a wide angle end of about 60° to 67° and a high zoom ratio of about 80 to 130, as well as high optical performance over the entire zoom range, and an image pickup apparatus including the zoom lens.

A zoom lens according to one embodiment of the present invention includes, in order from an object side to an image side: a first lens unit having a positive refractive power which does not move for zooming; a second lens unit having a negative refractive power for zooming; a third lens unit having the positive refractive power for zooming; a fourth lens unit having the negative refractive power which moves during zooming; and a fifth lens unit having the positive refractive power which does not move for zooming, in which the following conditional expressions are satisfied:

$$0.6 < |\beta 3F| < 1.0;$$

$$-4.0 < f4/f3 < -1.0; \text{ and}$$

$$20 < L2w/L3w < 300,$$

where $\beta 3F$ is a lateral magnification of the third lens unit at a position at which a lateral magnification of the second lens unit becomes $-1$; $f3$ is a focal length of the third lens unit; $f4$ is a focal length of the fourth lens unit; $L2w$ is a gap between the second lens unit and the third lens unit at a wide angle end; and $L3w$ is a gap between the third lens unit and the fourth lens unit at the wide angle end.

According to the present invention, it is possible to provide the zoom lens having a wide angle of view, a high zoom ratio, and high optical performance over the entire zoom range.

Further features of the present invention will become apparent from the following description of exemplary embodiments with reference to the attached drawings.

DESCRIPTION OF THE EMBODIMENTS

Embodiments of the present invention are described in detail below with reference to the accompanying drawings.

A zoom lens according to the present invention includes, in order from an object side to an image side, a first lens unit having a positive refractive power which does not move for zooming, a second lens unit having a negative refractive power for zooming, a third lens unit having a positive refractive power for zooming, a fourth lens unit having a negative refractive power which moves during zooming for correcting the image plane variation accompanying the zooming, and further a fifth lens unit having a positive refractive power which does not move for zooming.

Figure 15A:
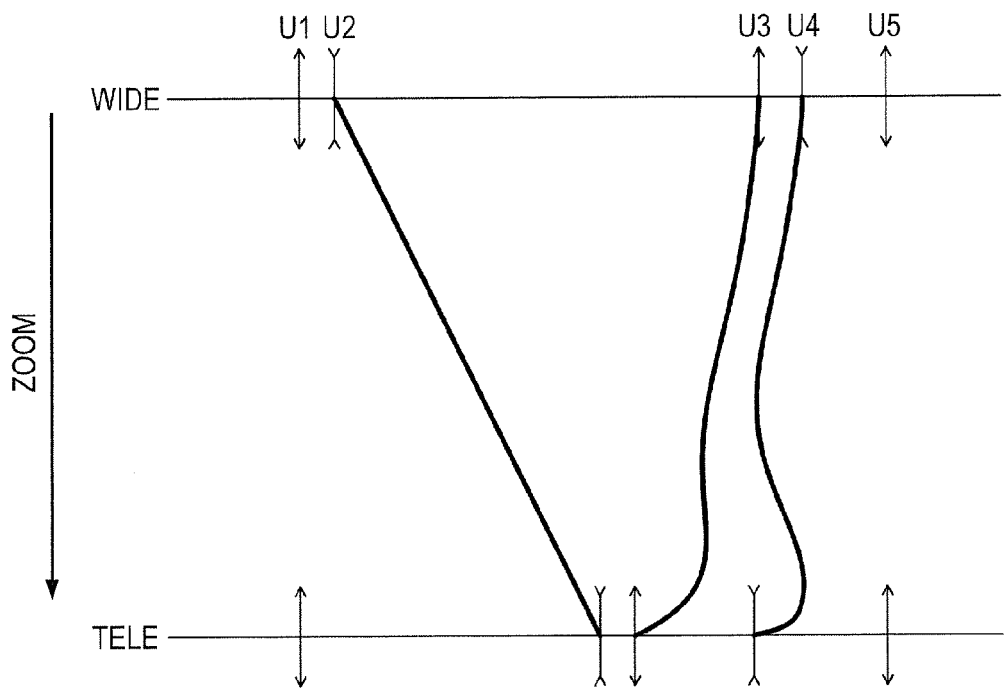
FIG. 15A is a diagram of a zoom lens according to the present invention.
Figure 15B:
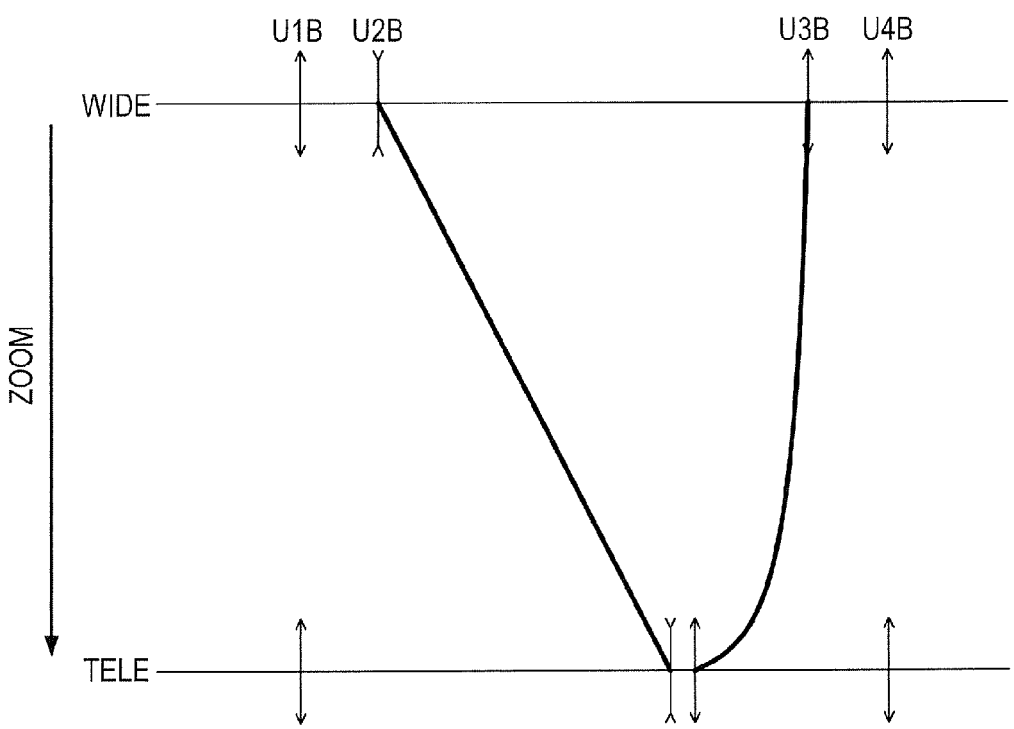
FIG. 15B is a diagram of a four-unit zoom lens according to the present invention.

FIGS. 15A and 15B are a diagram of a zoom lens according to the present invention and a diagram of a paraxial refractive power arrangement of a four-unit zoom lens, respectively. In the lens cross-sectional views, the left side is the subject (object) side, and the right side is the image side. A first lens unit U1 having the positive refractive power does not move during zooming. A second lens unit U2 having the negative refractive power for zooming moves on an optical axis to perform zooming. A third lens unit U3 having the positive refractive power for zooming moves on the optical axis to perform the zooming.

A fourth lens unit U4 having the negative refractive power moves during zooming and moves on the optical axis for correcting an image plane variation accompanying the zooming. An aperture stop is denoted by SP, and a fifth lens unit (relay lens unit) U5 having the positive refractive power and an imaging action does not move during zooming. In the fifth lens unit U5, a converter (extender) for converting a focal length and the like may be mounted.

In the zoom lens of each embodiment, a refractive power arrangement of the lens units at a wide angle end and moving loci of the second lens unit and the third lens unit during zooming are defined, to thereby effectively reduce a size and weight of the third lens unit U3 while attaining a wide angle of field and a high zoom ratio.

To be specific, a lateral magnification of the third lens unit at a position where a lateral magnification of the second lens unit becomes −1 is represented by β3F. Focal length of the third lens unit U3 is represented by f3. Focal length of the fourth lens unit U4 is represented by f4. An air gap between the second lens unit U2 and the third lens unit U3 at the wide angle end is represented by L2w, and an air gap between the third lens unit U3 and the fourth lens unit U4 at the wide angle end is represented by L3w.

Then, the following conditional expressions are satisfied:

$$0.6 < |\beta 3F| < 1.0 \quad (1);$$

$$-4.0 < f4/f3 < -1.0 \quad (2); \text{ and}$$

$$20 < L2w/L3w < 300 \quad (3).$$

Moving loci of the lens units during zooming in the embodiments are described with reference to FIGS. 15A and 15B.

In order to clarify the contrast between the lens units of the five-unit zoom lens according to the present invention illustrated in FIG. 15A and the lens units of the four-unit zoom lens illustrated in FIG. 15B, the first to fifth lens units are denoted by U1 to U5 in FIG. 15A, as in the lens cross-sectional views. The first to fourth lens units are denoted by U1B to U4B in FIG. 15B.

The zoom lens according to the embodiments of the present invention includes the first to fifth lens units in order from the object side to the image side as illustrated in FIG. 15A.

To be specific, the zoom lens includes the first lens unit U1 having the positive refractive power, the second lens unit U2 having the negative refractive power for zooming, the third lens unit U3 having the positive refractive power, the fourth lens unit U4 having the negative refractive power which moves during zooming for correcting the image plane variation accompanying the zooming, and the fifth lens unit U5 having the positive refractive power for imaging.

As illustrated in FIG. 15B, in the four-unit zoom lens, the moving locus of the third lens unit U3B is uniquely determined for image point correction accompanying the movement of the second lens unit during the zooming. To be specific, when the second lens unit U2B moves linearly as illustrated in FIG. 15B, the locus of the third lens unit U3B is determined so that the third lens unit U3B moves nonlinearly toward the object side along with the zooming from the wide angle end to a telephoto end.

On the other hand, as illustrated in FIG. 15A, in the five-unit zoom lens according to the embodiments of the present invention, with the configuration in which a zooming lens unit is constituted of three movable lens units and the fourth lens unit U4 performs the image point correction, the moving locus of the third lens unit U3 may be set arbitrarily.

Further, in the five-unit zoom lens of each embodiment, at around the position where the lateral magnification of the second lens unit becomes −1, a direction in which an image point of the second lens unit moves along the optical axis is reversed in accordance with a paraxial imaging relationship expressed by the following expression:

$$\beta = 1 - s'/f = s'/s.$$

where $\beta$ is a lateral magnification; s is a distance between an object point and an object point side principal point; s' is a distance between the image point and an image side principal point; and f is a focal length of the lens.

Moreover, when a focus of the second lens unit approaches an image point of the first lens unit as close as possible from the object side, the image point s' of the second lens unit diverges negatively (to object side), and an absolute value of a lateral magnification β2 of the second lens unit is increased at an accelerated rate. In the conventional zoom lens having high magnification, a ray height of the third lens unit becomes the maximum when the magnification is varied beyond the position where the lateral magnification of the second lens unit becomes −1, which determines an effective diameter of the third lens unit.

Figure 16:
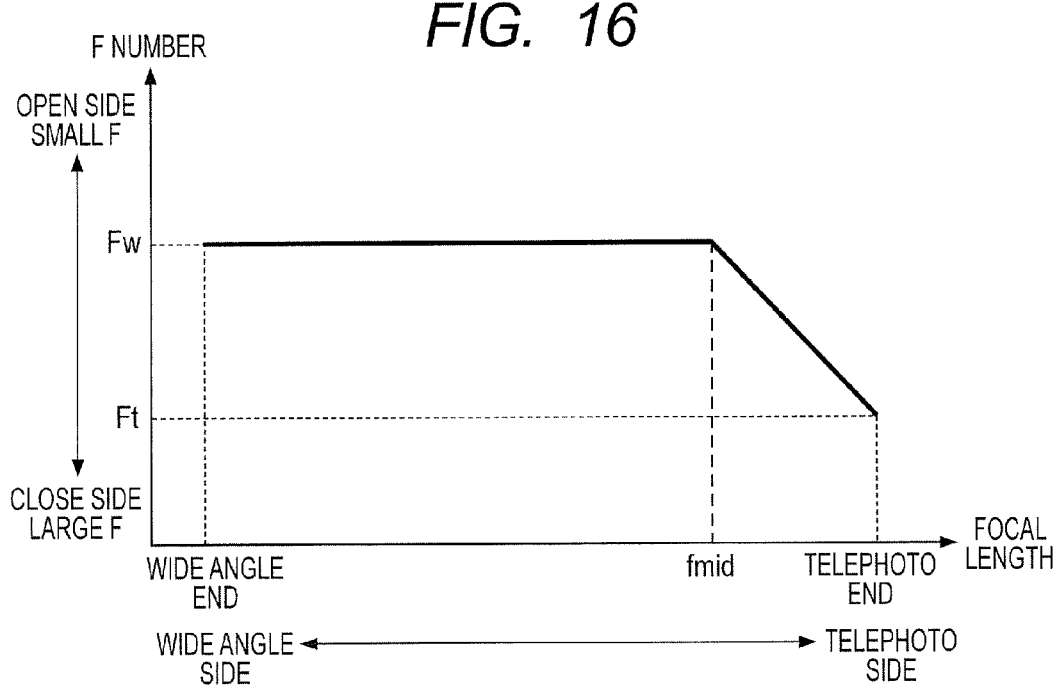
FIG. 16 is a schematic diagram of a relationship of a focal length and an F-number in a broadcasting zoom lens.

As illustrated in FIG. 16, a broadcasting zoom lens in particular has specifications in which an F-number is constant from the wide angle end to a predetermined middle zoom focal length fmid and increased monotonously (brightness is reduced monotonously) from fmid to the telephoto end. The middle zoom position in the embodiments of the present invention is fmid. fmid is approximately determined here by the following expression:

$$0.7 \times ftele \times Fw/Ft < fmid \leq ftele \times Fw/Ft$$

where ftele is a focal length at the telephoto end; Fw is an F-number at the wide angle end; and Ft is an F-number at the telephoto end.

In the embodiments, the lateral magnification β2 of the second lens unit at fmid is close to −1 (in the range of −1.0 to −1.5) as shown in numerical embodiments.

Figure 17:
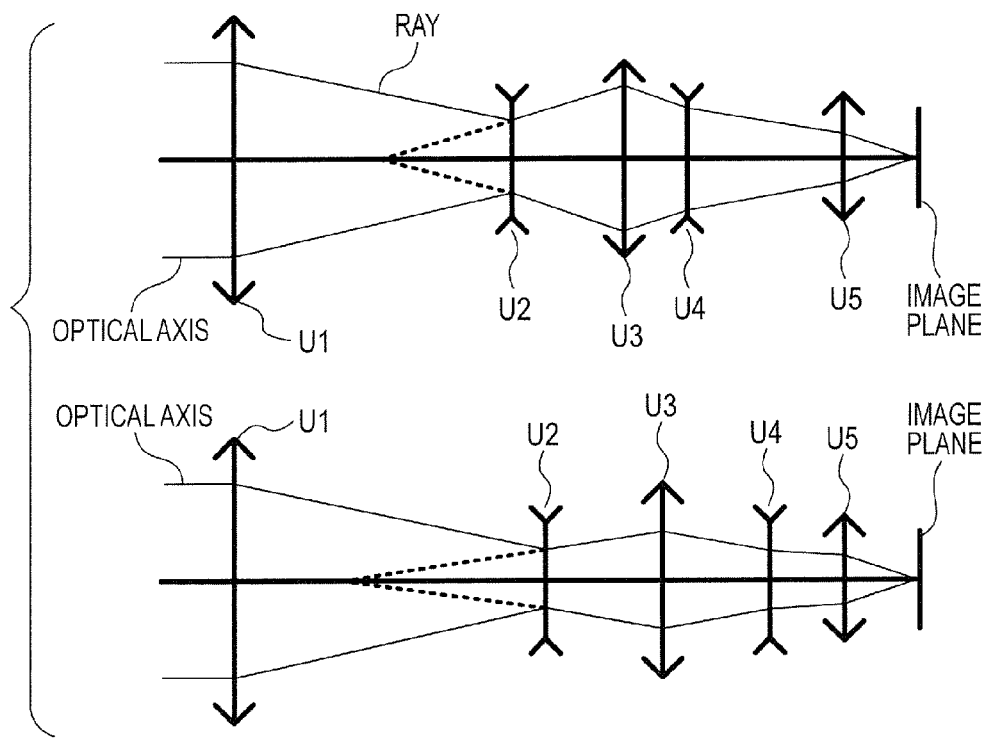
FIG. 17 is a schematic diagram of a paraxial principle according to the present invention.

FIG. 17 is a conceptual diagram illustrating two examples in which the entire lens system has the same focal length in a state in which the second lens unit U2 is arranged on the image side beyond the position where the lateral magnification of the second lens unit U2 becomes −1. As illustrated in FIG. 17, when the second lens unit U2 moves closer to the image side, the height of the ray that enters the third lens unit U3 may be suppressed to be low, which allows the effective diameter of the third lens unit U3 to be reduced. Further, when the second lens unit U2 is arranged closer to the image side, the lateral magnification of the second lens unit U2 is increased. Of the two examples of FIG. 17 having the same focal length, the embodiment in which the second lens unit U2 is arranged closer to the image side has smaller absolute values of lateral magnifications of the third lens unit U3 and the fourth lens unit U4, and hence may suppress the diameter of the third lens unit U3 to be small.

Figure 18A:
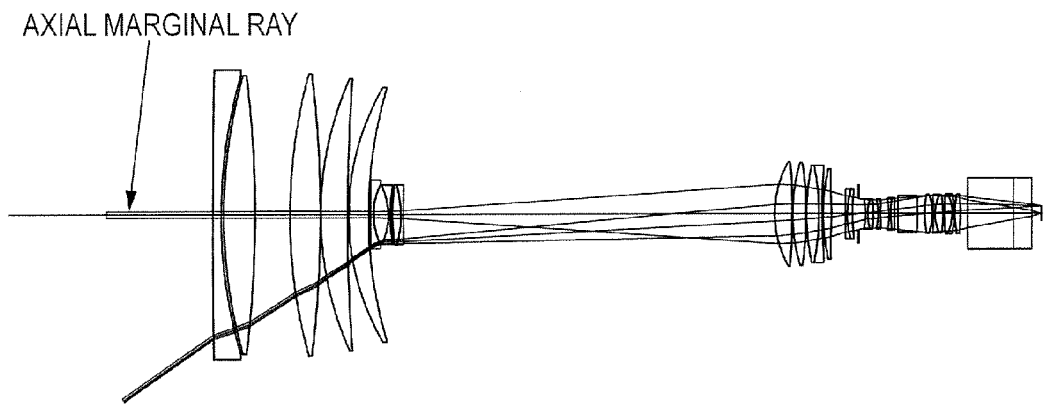
FIG. 18A is an optical path diagram at the wide angle end according to the present invention.
Figure 18B:
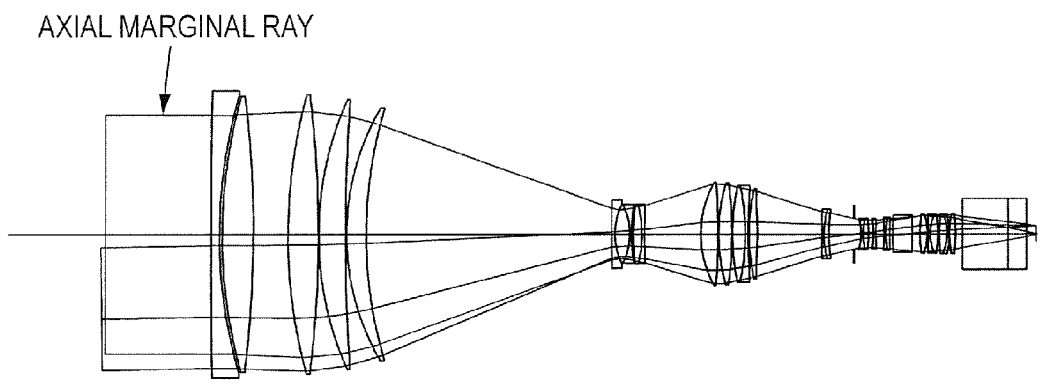
FIG. 18B is an optical path diagram at a middle zoom position according to the present invention.
Figure 18C:
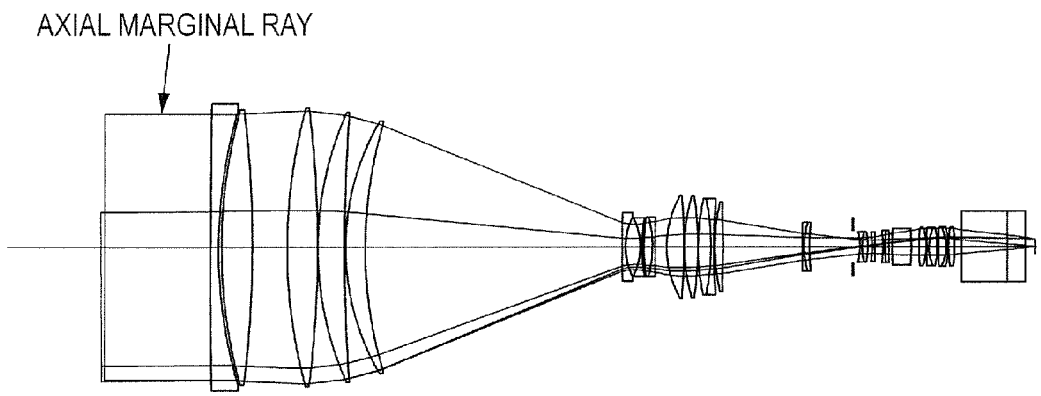
FIG. 18C is an optical path diagram at the telephoto end according to the present invention.

FIGS. 18A, 18B, and 18C are optical path diagrams at the wide angle end, the middle zoom position (330 mm), and the telephoto end according to this embodiment, respectively. As apparent from FIGS. 18A, 18B, and 18C, an axial marginal ray of the third lens unit U3 is low at the wide angle end and the telephoto end, and passes the highest position at the middle zoom position. This middle zoom position is near the position where the lateral magnification of the second lens unit U2 becomes −1, and when the absolute value of the lateral magnification of the third lens unit U3 is reduced as illustrated in FIG. 17, the height of the axial marginal ray may be reduced.

In each embodiment, the focal length with which the axial marginal ray is maximized and which determines the diameter of the third lens unit U3 is described as the middle zoom focal length in each numerical embodiment, and illustrated as a longitudinal aberration diagram in the figure corresponding to the embodiment.

Conditional Expression (1) is directed to the lateral magnification β3F of the third lens unit at the position where the lateral magnification of the second lens unit becomes −1. Conditional Expression (1) is satisfied to mainly reduce the size and weight of the third lens unit U3.

When the upper limit condition of Conditional Expression (1) is not satisfied, at the focal length of the entire lens system that determines the diameter of the third lens unit U3, the height of the axial marginal ray is increased, which is disadvantageous in reducing the size and weight of the third lens unit. When the lower limit condition of Conditional Expression (1) is not satisfied, the third lens unit U3 and the fourth lens unit U4 move by large amounts to the image side, which is disadvantageous in reducing the size of the entire lens system.

Conditional Expression (2) is directed to a ratio of the focal length f3 of the third lens unit U3 and the focal length f4 of the fourth lens unit U4. Conditional Expression (2) is satisfied to increase the zoom ratio and reduce the size of the entire lens system.

When the upper limit condition of Conditional Expression (2) is not satisfied, the negative refractive power of the fourth lens unit U4 is increased, and hence an effective ray diameter of the first lens unit U1 is increased at the telephoto side, which is undesirable. When the lower limit condition of Conditional Expression (2) is not satisfied, the positive refractive power of the third lens unit U3 is increased, and hence the curvature is increased to increase high-order aberrations, which is undesirable because variations in aberrations are increased during zooming.

Conditional Expression (3) is directed to a ratio of the air gap L2w between the second lens unit U2 and the third lens unit U3 at the wide angle end and the air gap L3w between the third lens unit U3 and the fourth lens unit U4 at the wide angle end. Conditional Expression (3) is satisfied to increase the angle of field and the zoom ratio.

When the upper limit condition of Conditional Expression (3) is not satisfied, the gap between the third lens unit U3 and the fourth lens unit U4 becomes too small at the wide angle end, and hence the third lens unit U3 and the fourth lens unit U4 may be brought into contact with each other, which is undesirable. When the lower limit condition of Conditional Expression (3) is not satisfied, an amount of movement of the second lens unit U2 during zooming is reduced, which makes it difficult to obtain a sufficient zoom ratio, and hence is undesirable.

It is more preferred to set numerical ranges of Conditional Expressions (1) to (3) as follows:

$$0.7 < |\beta 3F| < 0.9 \qquad (1a);$$

$$-3.2 < f4/f3 < -1.5 \qquad (2a); \text{ and}$$

$$30 < L2w/L3w < 60 \qquad (3a).$$

Further, a focal length of the first lens unit U1 is represented by f1, a focal length of the second lens unit U2 is represented by f2, and the focal length of the third lens unit U3 is represented by f3. An air gap between the third lens unit U3 and the fourth lens unit U4 at the position where the lateral magnification of the second lens unit U2 becomes −1 is represented by L3F. An amount of movement of the second lens unit U2 from the wide angle end at the position where the lateral magnification of the second lens unit U2 becomes −1 is represented by m2F, and an amount of movement of the third lens unit U3 from the wide angle end at the position where the lateral magnification of the second lens unit U2 becomes −1 is represented by m3F. The zoom ratio from the wide angle end to the telephoto end is represented by Z. Then, it is preferred to satisfy at least one of the following conditions:

$$-11.0 < f1/f2 < -8.0 \qquad (4);$$

$$-0.5 < f2/f3 < -0.3 \qquad (5);$$

$$0.01 < L3w/L3F < 1.0 \qquad (6);$$

$$3 < |m2F/m3F| < 6 \qquad (7); \text{ and}$$

$$Z > 80 \qquad (8).$$

Conditional Expression (4) is directed to a ratio of the focal length f1 of the first lens unit U1 and the focal length f2 of the second lens unit. Conditional Expression (4) is satisfied to increase the zoom ratio and reduce the size of the entire lens system. When the upper limit condition of Conditional Expression (4) is not satisfied, the focal length f2 of the second lens unit U2 becomes relatively too long with respect to the focal length f1 of the first lens unit U1, which results in a paraxial arrangement that is difficult to increase the zoom ratio, and hence it becomes difficult to increase the zoom ratio and reduce the size of the entire system. When the lower limit condition of Conditional Expression (4) is not satisfied, the focal length f1 of the first lens unit U1 becomes relatively too long with respect to the focal length f2 of the second lens unit U2, which increases the amount of movement required by the second lens unit to increase the zoom ratio, and hence is disadvantageous in reducing the size of the entire system.

Conditional Expression (5) is directed to a ratio of the focal length f2 of the second lens unit U2 and the focal length f3 of the third lens unit U3. Conditional Expression (5) is satisfied to suppress the amount of movement of the magnification-varying lens units accompanying the zooming.

When the upper limit condition of Conditional Expression (5) is not satisfied, the focal length f3 of the third lens unit U3 becomes relatively too long with respect to the focal length f2 of the second lens unit U2, which increases the amount of movement required by the third lens unit during zooming, and hence is disadvantageous in reducing the size of the entire system. When the lower limit condition of Conditional Expression (5) is not satisfied, the focal length f2 of the second lens unit U2 becomes relatively too long with respect to the focal length f3 of the third lens unit U3, which increases the amount of movement required by the second lens unit during zooming, and hence is disadvantageous in reducing the size of the entire system.

Conditional Expression (6) is directed to a ratio of the air gap L3F between the third lens unit U3 and the fourth lens unit U4 at the position where the lateral magnification of the second lens unit U2 becomes −1 and the air gap L3w between the third lens unit U3 and the fourth lens unit U4 at the wide angle end. Conditional Expression (6) may be satisfied to suppress the diameter of the third lens unit U3 while reducing the size of the entire system.

When the upper limit condition of Conditional Expression (6) is not satisfied, the absolute values of the lateral magnifications of the third lens unit U3 and the fourth lens unit U4 at the position where the lateral magnification of the second lens unit U2 becomes −1 become too large, which is disadvantageous in suppressing the diameter of the third lens unit U3, and hence is undesirable. When the lower limit condition of Conditional Expression (6) is not satisfied, the air gap between the third lens unit U3 and the fourth lens unit U4 at the position where the lateral magnification of the second lens unit U2 becomes −1 becomes too large, which is disadvantageous in reducing the size of the entire lens system, and hence is undesirable.

Conditional Expression (7) is directed to a ratio of the respective amounts of movement m2F and m3F of the second lens unit U2 and the third lens unit U3 from the wide angle end at the position where the lateral magnification of the second lens unit U2 becomes −1. Conditional Expression (7) may be satisfied to suppress the diameter of the third lens unit U3 while reducing the size of the entire system.

When the upper limit condition of Conditional Expression (7) is not satisfied, the fourth lens unit U4 for performing image plane correction moves by a large amount to the image side at the position where the lateral magnification of the second lens unit U2 becomes −1, which is disadvantageous in reducing the size of the entire system, and hence is undesirable. When the lower limit condition of Conditional Expression (7) is not satisfied, the third lens unit U3 moves by a large amount to the object side at the position where the lateral magnification of the second lens unit U2 becomes −1, which is disadvantageous in suppressing the diameter of the third lens unit U3, and hence is undesirable.

Conditional Expression (8) is directed to the zoom ratio from the wide angle end to the telephoto end. The present invention becomes more effective when applied to a zoom lens that satisfies Conditional Expression (8).

When the lower limit condition of Conditional Expression (8) is not satisfied, a zoom lens that does not provide the effect of increasing the zoom ratio by moving the second lens unit U2 beyond the position where the lateral magnification of the second lens unit U2 becomes −1 may be designed, and hence the effects of the present invention cannot be sufficiently provided, which is undesirable.

It is preferred that the third lens unit U3 has at least one aspherical surface. When the aspherical surface is provided to the third lens unit U3 that can move freely during zooming, effective correction of variations in off-axial aberrations such as a coma due to the zooming is facilitated.

It is preferred that the fourth lens unit U4 includes at least one negative lens and one positive lens. A concave lens and a convex lens are used for the fourth lens unit which moves during zooming and moves for correcting the image plane variation accompanying the zooming to facilitate the effective correction of the variations in aberrations due to the zooming, especially a variation in chromatic aberration.

It is more preferred to set numerical ranges of Conditional Expressions (4) to (8) as follows:

$$-10.0 < f1/f2 < -9.0 \qquad (4a);$$

$$0.43 < f2/f3 < -0.40 \qquad (5a);$$

$$0.09 < L3w/L3F < 0.25 \qquad (6a);$$

$$3.8 < |m2F/m3F| < 5.1 \qquad (7a); \text{ and}$$

$$Z > 85 \qquad (8a).$$

Features of lens configurations of Numerical Embodiments 1 to 7 of the zoom lens according to the present invention are now described. In the lens cross-sectional views of the embodiments, DG is a color separation prism, an optical filter, and the like and is illustrated as a glass block in the corresponding figures. An image plane IP corresponds to an image plane of a solid state image pickup element.

Embodiment 1

A description is given of the second lens unit U2, the third lens unit U3, and the fourth lens unit U4, which are lens units which move during zooming in Embodiment 1 corresponding to Numerical Embodiment 1 to be described later. The second lens unit U2 corresponds to the 11th to 17th lens surfaces in Numerical Embodiment 1, and includes, in order from the object side to the image side, two negative lenses and a cemented lens formed by cementing a positive lens and a negative lens in the stated order.

The third lens unit U3 corresponds to the 18th to 26th lens surfaces in Numerical Embodiment 1, and includes, in order from the object side to the image side, two positive lenses, a cemented lens formed by cementing a positive lens and a negative lens in the stated order, and a positive lens.

The fourth lens unit U4 corresponds to the 27th to 29th lens surfaces in Numerical Embodiment 1, and includes, in order from the object side to the image side, a cemented lens formed by cementing a negative lens and a positive lens in the stated order.

The aspherical surfaces are used for the 11th, 18th, and 26th lens surfaces. The 11th lens surface mainly corrects a distortion on the wide angle side, the 18th lens surface corrects off-axial aberrations such as a coma on the wide angle side, and the 26th lens surface corrects a spherical aberration on the telephoto side.

Figure 1:
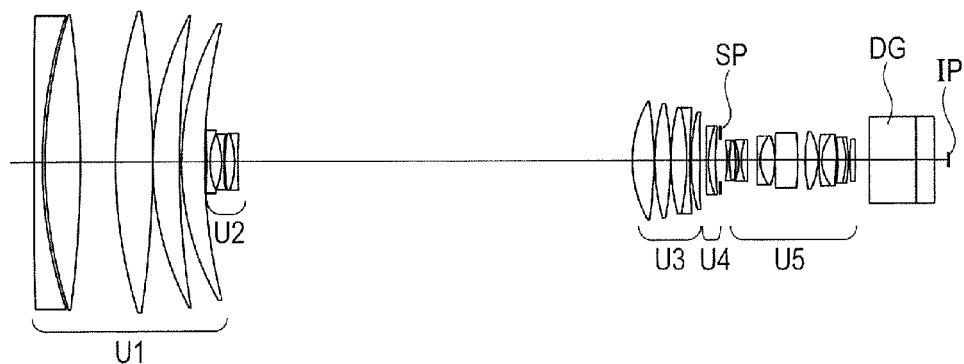
FIG. 1 is a lens cross-sectional view of a zoom lens at a wide angle end according to Embodiment 1.
Figure 2A:
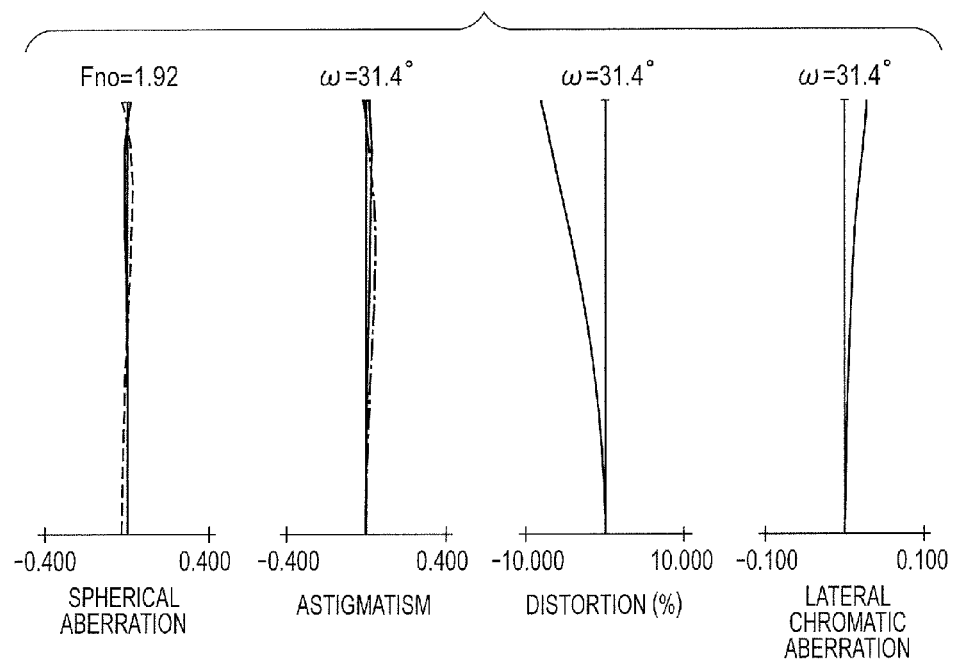
FIG. 2A is an aberration diagram at the wide angle end according to Embodiment 1.
Figure 2B:
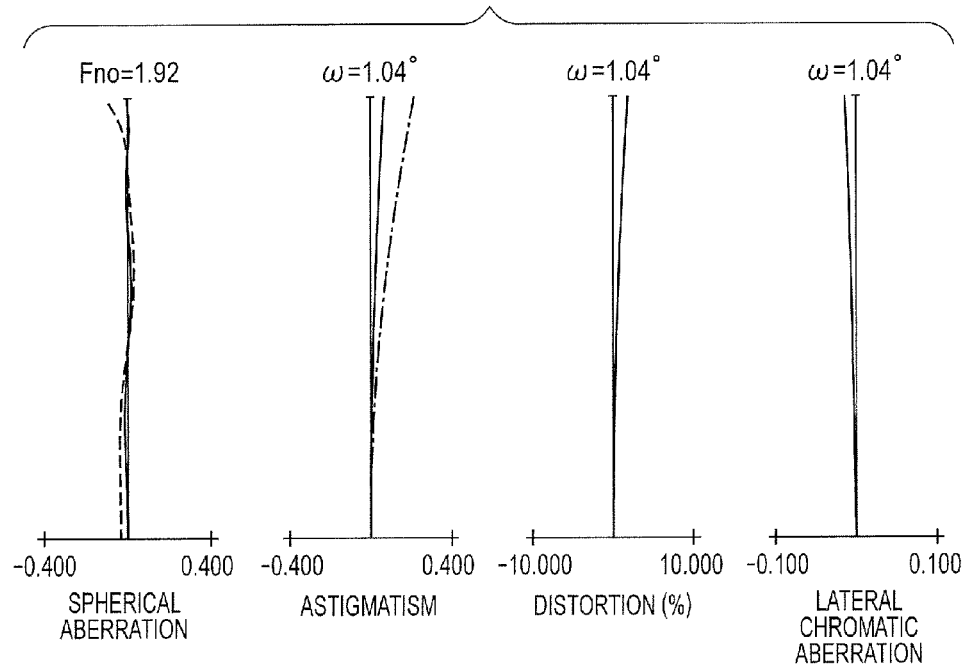
FIG. 2B is an aberration diagram at a focal length of 302 mm according to Embodiment 1.
Figure 2C:
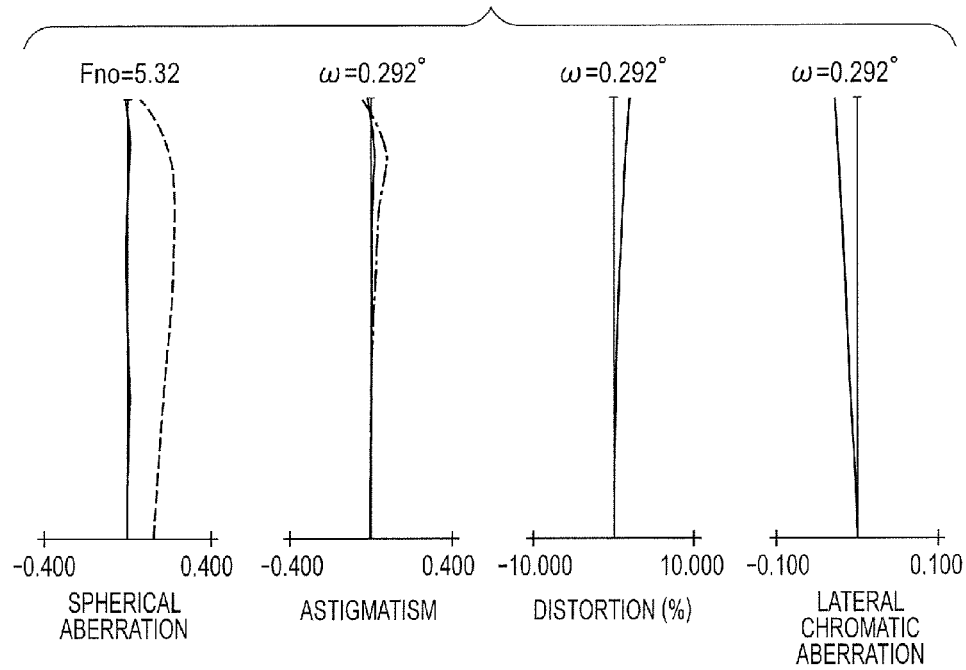
FIG. 2C is an aberration diagram at a telephoto end according to Embodiment 1.

FIG. 1 is a lens cross-sectional view when focused on an object at infinity at the wide angle end (short focal length end) according to Numerical Embodiment 1 as Embodiment 1 of the present invention. FIGS. 2A, 2B, and 2C are longitudinal aberration diagrams when focused on the object at infinity at the wide angle end, f=302 mm, and the telephoto end (long focal length end) according to Numerical Embodiment 1, respectively.

In the aberration diagrams, the straight line and the broken line in the spherical aberration are an e-line and a g-line, respectively. The solid line and the alternate long and short dash line in the astigmatism are a sagittal image plane and a meridional image plane, respectively, and a lateral chromatic aberration is represented by the g-line. ω is a paraxial half angle of field, and Fno is an F-number. Note that, in the following embodiments, the wide angle end and the telephoto end refer to zoom positions where the lens units for zooming are mechanically located at both sides of a movable range on the optical axis.

Corresponding values of the conditional expressions in this embodiment are shown in Table 1. This numerical embodiment satisfies all the conditional expressions to achieve the wide angle of field and the high zoom ratio with a focal length of 9 mm at the wide angle end and a zoom ratio of 120 and to reduce the size and weight with the lens diameter of the third lens unit U3 at the end on the object side of 81.11 mm, while achieving excellent optical performance.

Embodiment 2

A description is given of the second lens unit U2, the third lens unit U3, and the fourth lens unit U4, which are lens units which move during zooming in Embodiment 2 corresponding to Numerical Embodiment 2 to be described later. The second lens unit U2 corresponds to the 11th to 17th lens surfaces in Numerical Embodiment 2, and includes, in order from the object side to the image side, two negative lenses and a cemented lens formed by cementing a positive lens and a negative lens in the stated order.

The third lens unit U3 corresponds to the 18th to 25th lens surfaces in Numerical Embodiment 2, and includes, in order from the object side to the image side, two positive lenses, a negative lens, and a positive lens.

The fourth lens unit U4 corresponds to the 26th to 28th lens surfaces in Numerical Embodiment 2, and includes, in order from the object side to the image side, a cemented lens formed by cementing a negative lens and a positive lens in the stated order.

The aspherical surfaces are used for the 11th, 19th, and 25th lens surfaces. The 11th lens surface mainly corrects a distortion on the wide angle side, the 19th lens surface corrects off-axial aberrations such as a coma on the wide angle side, and the 25th lens surface corrects a spherical aberration on the telephoto side.

Figure 3:
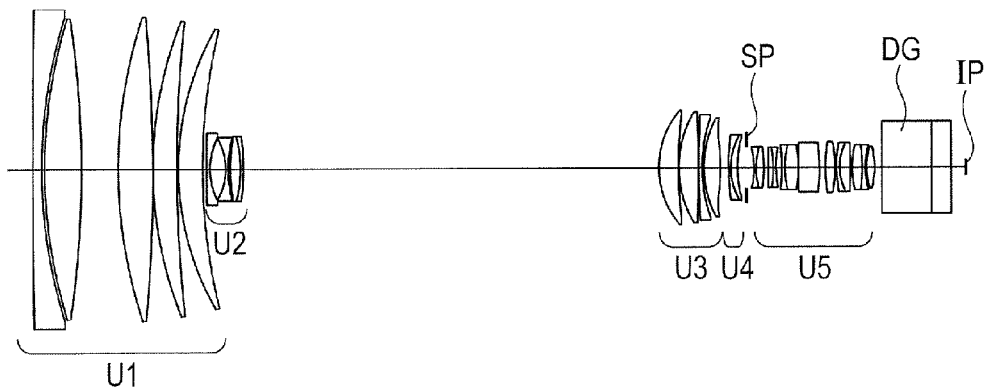
FIG. 3 is a lens cross-sectional view of a zoom lens at the wide angle end according to Embodiment 2.
Figure 4A:
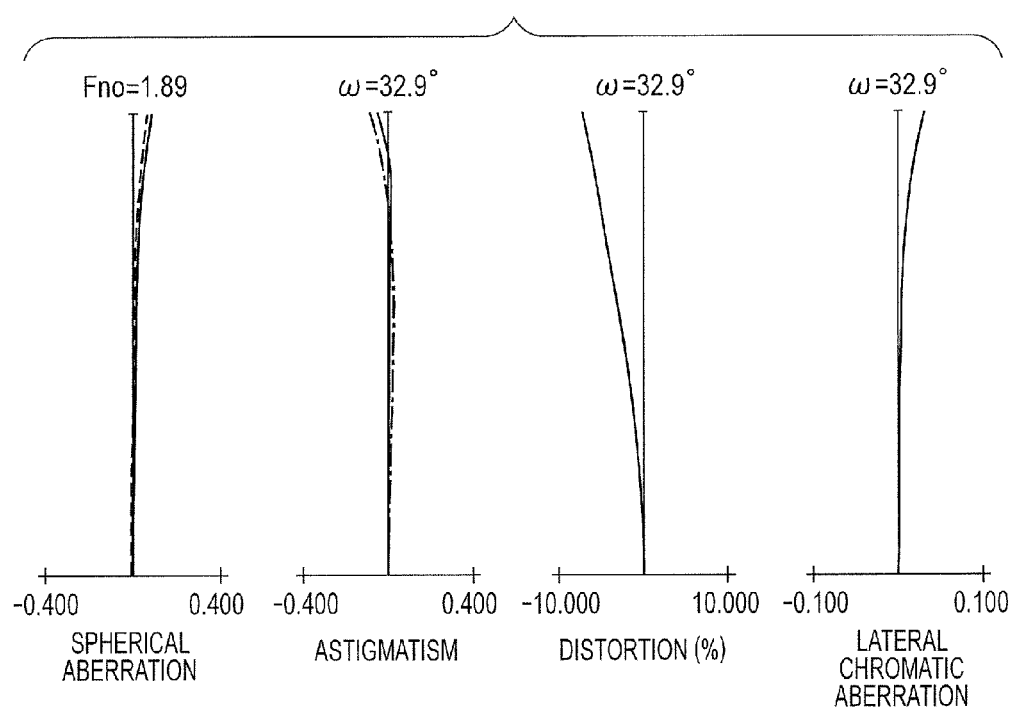
FIG. 4A is an aberration diagram at the wide angle end according to Embodiment 2.
Figure 4B:
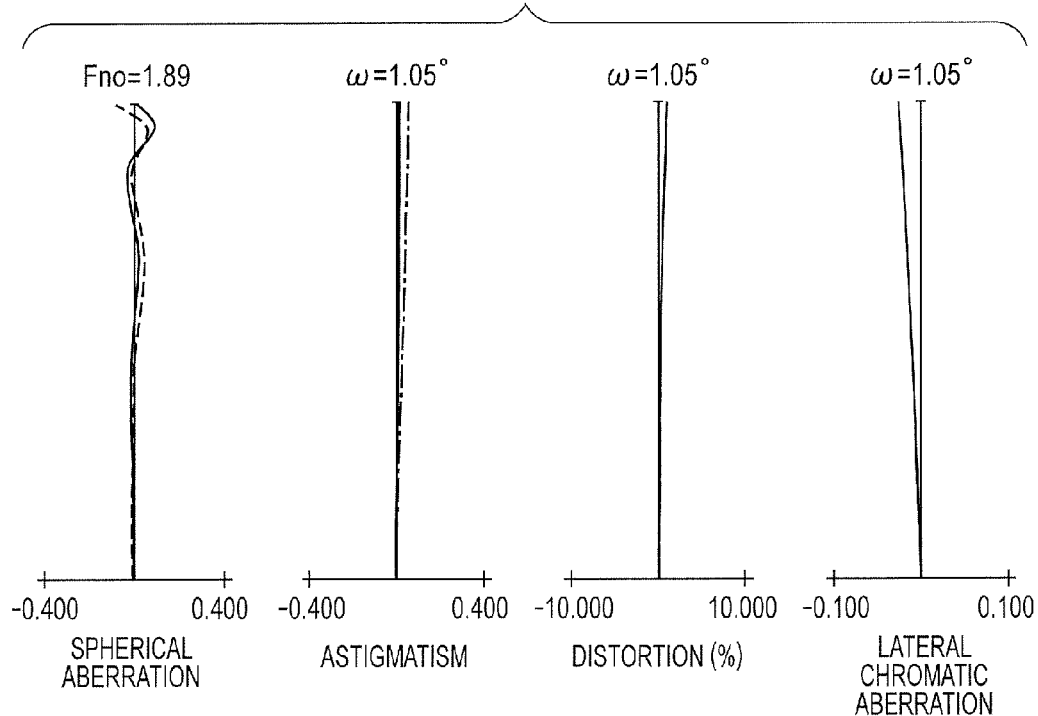
FIG. 4B is an aberration diagram at a focal length of 300 mm according to Embodiment 2.
Figure 4C:
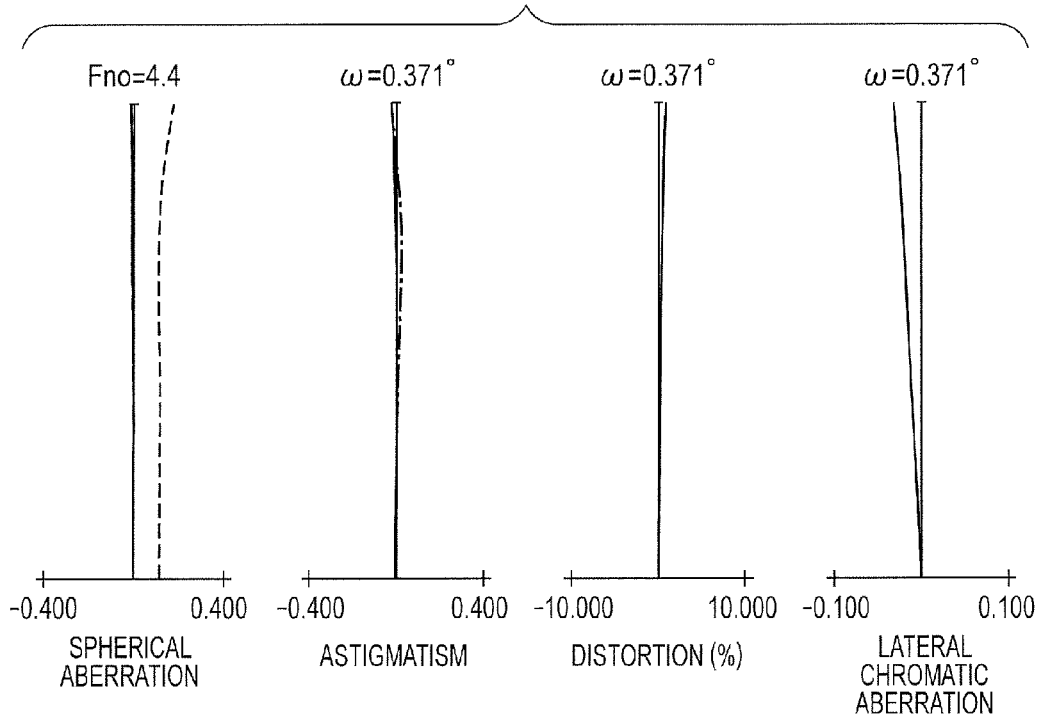
FIG. 4C is an aberration diagram at the telephoto end according to Embodiment 2.

FIG. 3 is a lens cross-sectional view when focused on an object at infinity at the wide angle end according to Numerical Embodiment 2 as Embodiment 2 of the present invention. FIGS. 4A, 4B, and 4C are longitudinal aberration diagrams when focused on the object at infinity at the wide angle end, f=300 mm, and the telephoto end according to Numerical Embodiment 2, respectively.

Corresponding values of the conditional expressions in this embodiment are shown in Table 1. This numerical embodiment satisfies all the conditional expressions to achieve the wide angle of field and the high zoom ratio with a focal length of 8.5 mm at the wide angle end and a zoom ratio of 100 and to reduce the size and weight with the lens diameter of the third lens unit U3 at the end on the object side of 74.75 mm, while achieving excellent optical performance.

Embodiment 3

A description is given of the second lens unit U2, the third lens unit U3, and the fourth lens unit U4, which are lens units which move during zooming in Embodiment 3 corresponding to Numerical Embodiment 3 to be described later. The second lens unit U2 corresponds to the 11th to 17th lens surfaces in Numerical Embodiment 3, and includes, in order from the object side to the image side, a negative lens, a cemented lens formed by cementing a negative lens and a positive lens in the stated order, and a negative lens.

The third lens unit U3 corresponds to the 18th to 26th lens surfaces in Numerical Embodiment 3, and includes, in order from the object side to the image side, two positive lenses, a cemented lens formed by cementing a positive lens and a negative lens in the stated order, and a positive lens.

The fourth lens unit U4 corresponds to the 27th to 29th lens surfaces in Numerical Embodiment 3, and includes, in order from the object side to the image side, a cemented lens formed by cementing a negative lens and a positive lens in the stated order.

The aspherical surfaces are used for the 11th, 19th, and 26th lens surfaces. The 11th lens surface mainly corrects a distortion on the wide angle side, the 19th lens surface corrects off-axial aberrations such as a coma on the wide angle side, and the 26th lens surface corrects a spherical aberration on the telephoto side.

Figure 5:
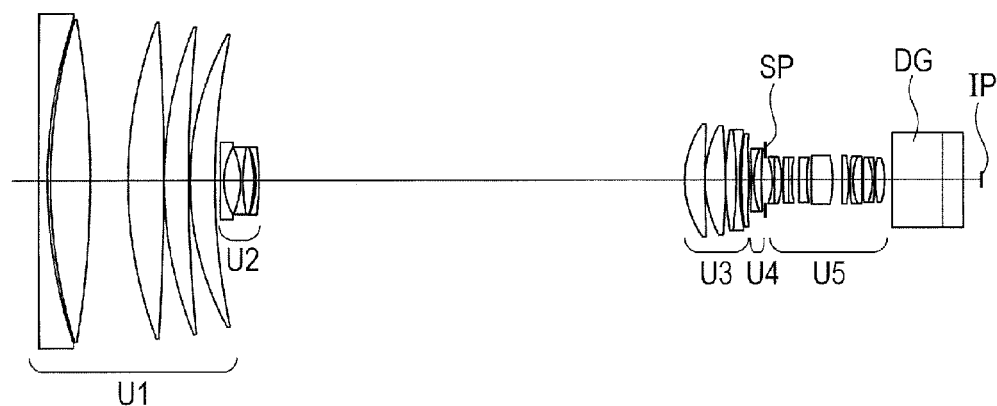
FIG. 5 is a lens cross-sectional view of a zoom lens at the wide angle end according to Embodiment 3.
Figure 6A:
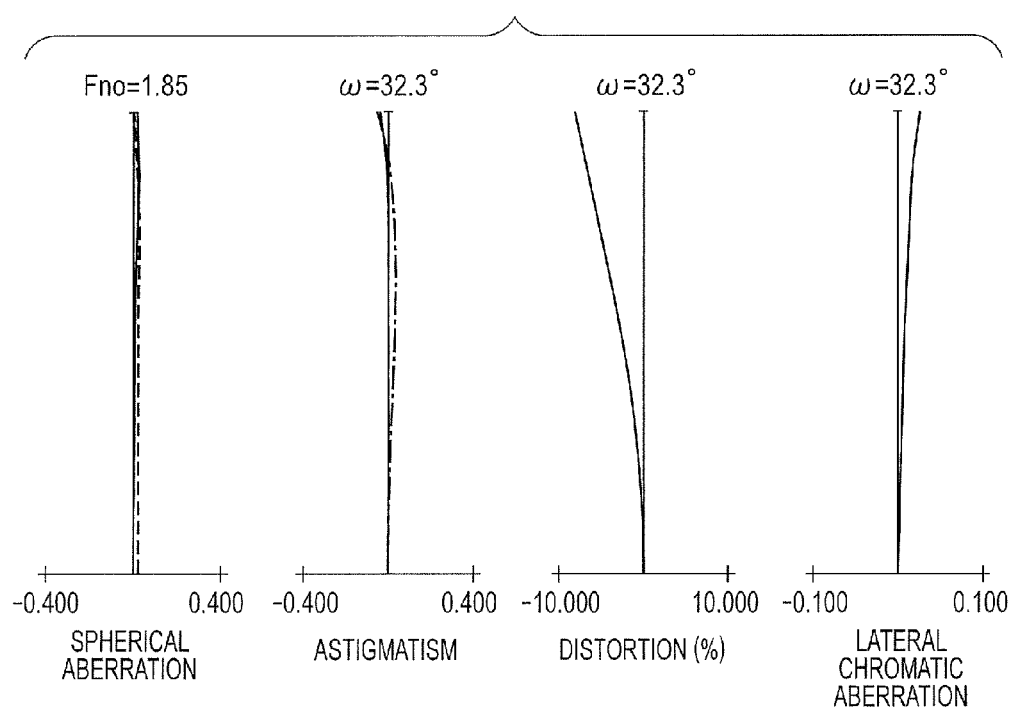
FIG. 6A is an aberration diagram at the wide angle end according to Embodiment 3.
Figure 6B:
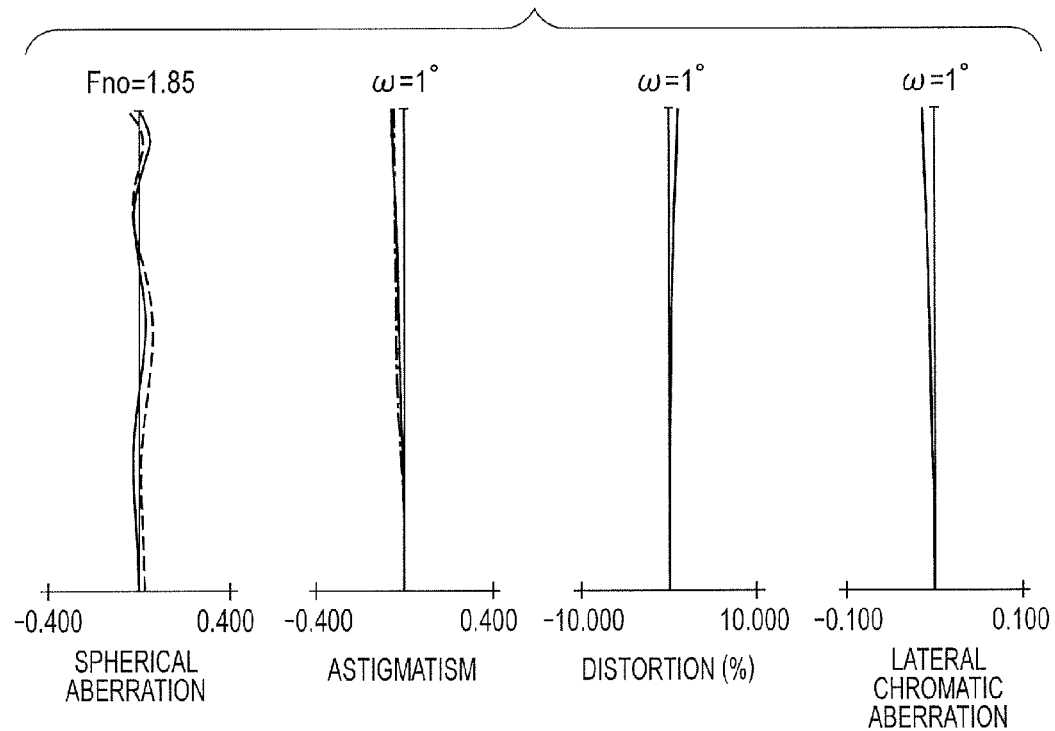
FIG. 6B is an aberration diagram at a focal length of 314 mm according to Embodiment 3.
Figure 6C:
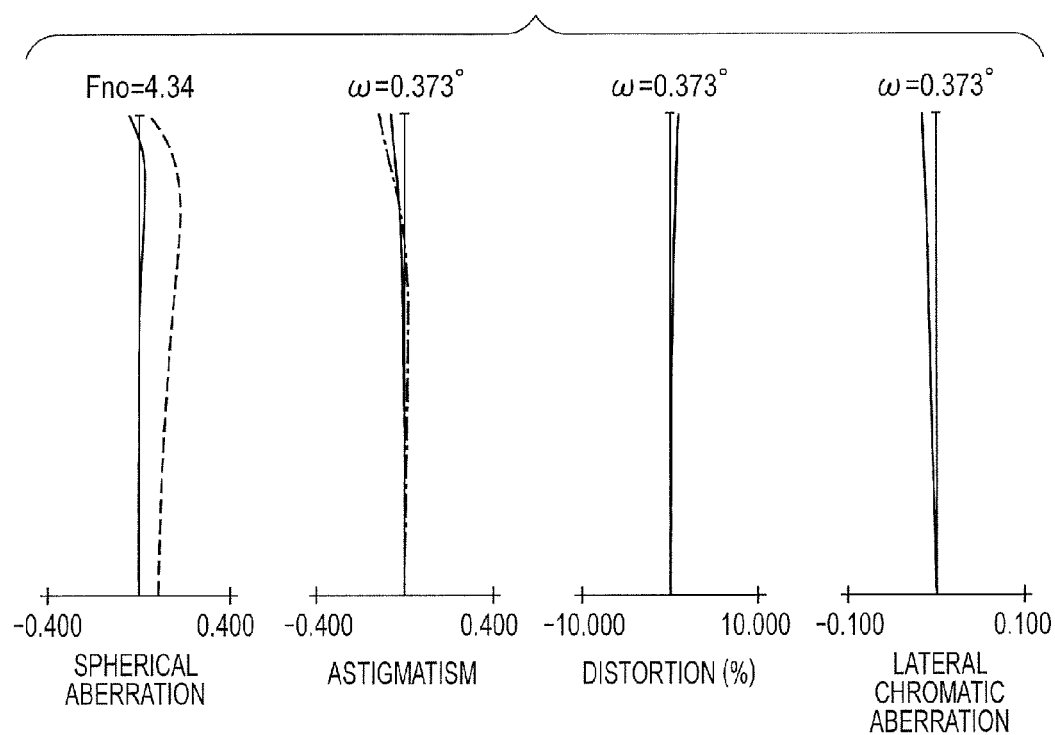
FIG. 6C is an aberration diagram at the telephoto end according to Embodiment 3.

FIG. 5 is a lens cross-sectional view when focused on an object at infinity at the wide angle end according to Numerical Embodiment 3 as Embodiment 3 of the present invention. FIGS. 6A, 6B, and 6C are longitudinal aberration diagrams when focused on the object at infinity at the wide angle end, f=314 mm, and the telephoto end according to Numerical Embodiment 3, respectively.

Corresponding values of the conditional expressions in this embodiment are shown in Table 1. This numerical embodiment satisfies all the conditional expressions to achieve the wide angle of field and the high zoom ratio with a focal length of 8.7 mm at the wide angle end and a zoom ratio of 97 and to reduce the size and weight with the lens diameter of the third lens unit U3 at the end on the object side of 71.88 mm, while achieving excellent optical performance.

Embodiment 4

A description is given of the second lens unit U2, the third lens unit U3, and the fourth lens unit U4, which are lens units which move during zooming in Embodiment 4 corresponding to Numerical Embodiment 4 to be described later. The second lens unit U2 corresponds to the 11th to 18th lens surfaces in Numerical Embodiment 4, and includes, in order from the object side to the image side, two negative lenses, a positive lens, and a negative lens.

The third lens unit U3 corresponds to the 18th to 28th lens surfaces in Numerical Embodiment 4, and includes, in order from the object side to the image side, a positive lens, a cemented lens formed by cementing a negative lens and a positive lens in the stated order, a cemented lens formed by cementing a negative lens and a positive lens in the stated order, and a positive lens.

The fourth lens unit U4 corresponds to the 29th to 31st lens surfaces in Numerical Embodiment 4, and includes, in order from the object side to the image side, a cemented lens formed by cementing a positive lens and a negative lens in the stated order.

The aspherical surfaces are used for the 11th, 23rd, and 28th lens surfaces. The 11th lens surface mainly corrects a distortion on the wide angle side, the 23rd lens surface corrects off-axial aberrations such as a coma on the wide angle side, and the 28th lens surface corrects a spherical aberration on the telephoto side.

Figure 7:
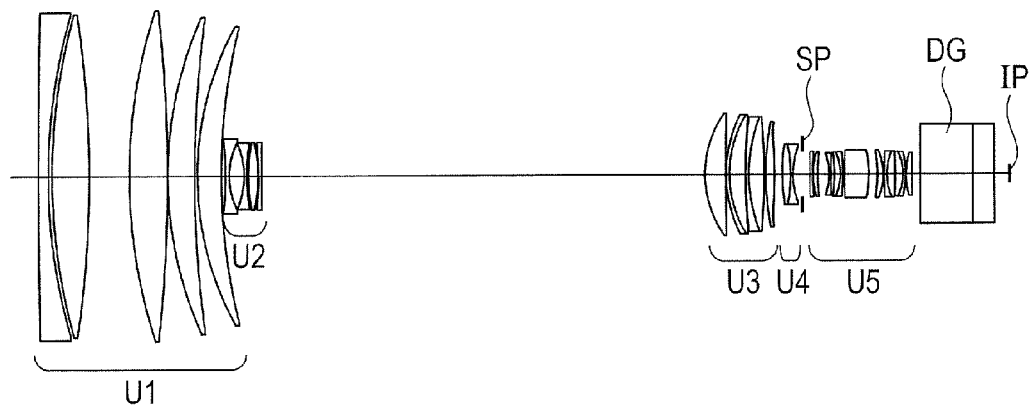
FIG. 7 is a lens cross-sectional view of a zoom lens at the wide angle end according to Embodiment 4.
Figure 8A:
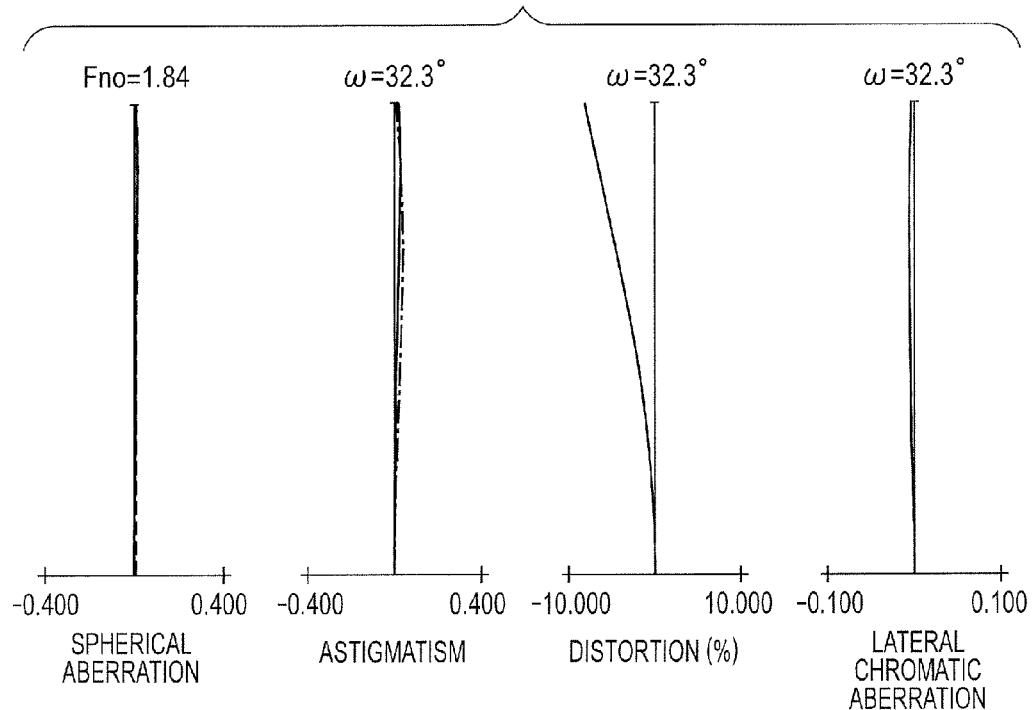
FIG. 8A is an aberration diagram at the wide angle end according to Embodiment 4.
Figure 8B:
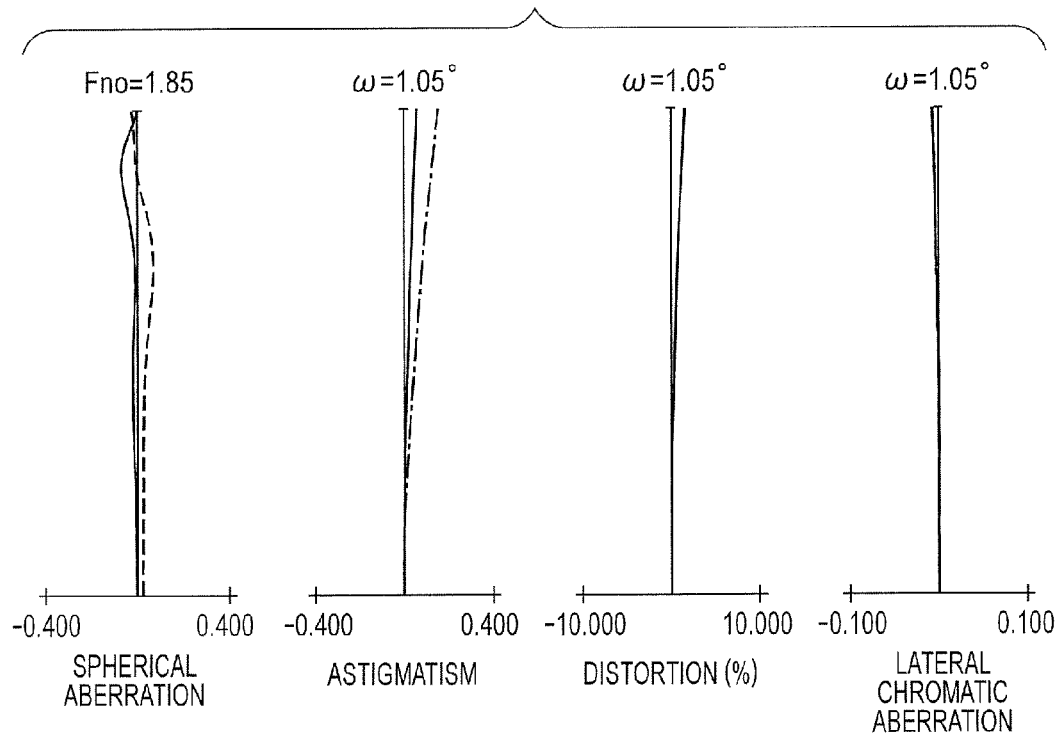
FIG. 8B is an aberration diagram at a focal length of 301 mm according to Embodiment 4.
Figure 8C:
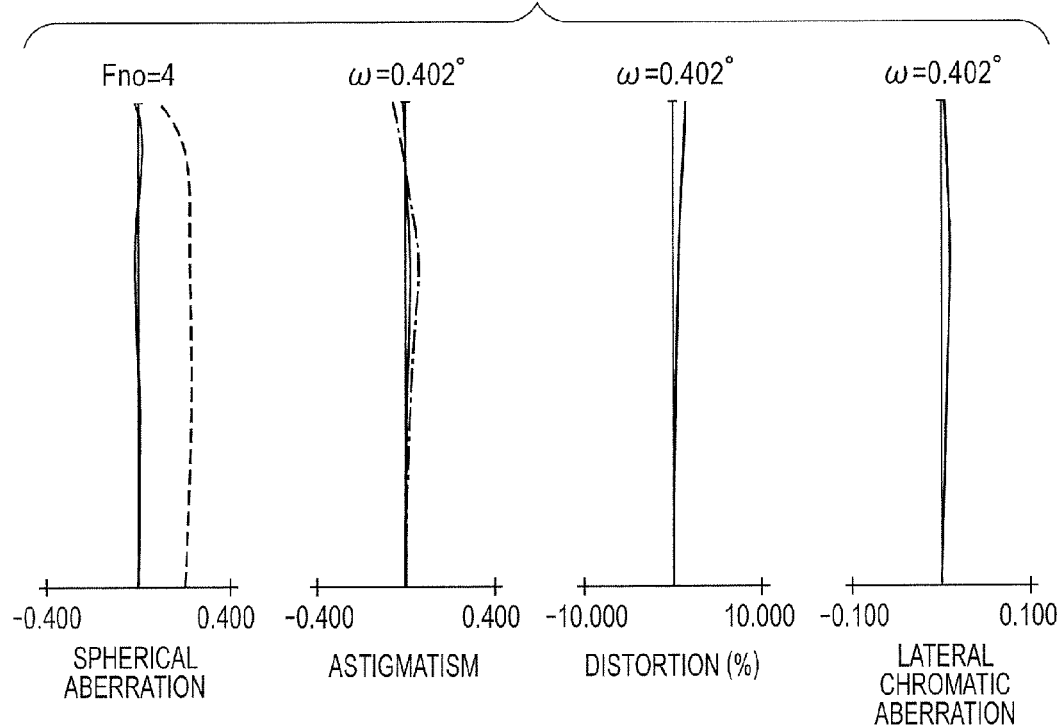
FIG. 8C is an aberration diagram at the telephoto end according to Embodiment 4.

FIG. 7 is a lens cross-sectional view when focused on an object at infinity at the wide angle end according to Numerical Embodiment 4 as Embodiment 4 of the present invention. FIGS. 8A, 8B, and 8C are longitudinal aberration diagrams when focused on the object at infinity at the wide angle end, f=301 mm, and the telephoto end according to Numerical Embodiment 4, respectively.

Corresponding values of the conditional expressions in this embodiment are shown in Table 1. This numerical embodiment satisfies all the conditional expressions to achieve the wide angle of field and the high zoom ratio with a focal length of 8.7 mm at the wide angle end and a zoom ratio of 90 and to reduce the size and weight with the lens diameter of the third lens unit U3 at the end on the object side of 74.40 mm, while achieving excellent optical performance.

Embodiment 5

A description is given of the second lens unit U2, the third lens unit U3, and the fourth lens unit U4, which are lens units which move during zooming in Embodiment 5 corresponding to Numerical Embodiment 5 to be described later. The second lens unit U2 corresponds to the 11th to 17th lens surfaces in Numerical Embodiment 5, and includes, in order from the object side to the image side, two negative lenses and a cemented lens formed by cementing a positive lens and a negative lens in the stated order.

The third lens unit U3 corresponds to the 18th to 26th lens surfaces in Numerical Embodiment 5, and includes, in order from the object side to the image side, two positive lenses, a cemented lens formed by cementing a negative lens and a positive lens in the stated order, and a positive lens.

The fourth lens unit U4 corresponds to the 27th and 28th lens surfaces in Numerical Embodiment 5, and includes a negative lens.

The aspherical surfaces are used for the 11th, 21st, and 26th lens surfaces. The 11th lens surface mainly corrects a distortion on the wide angle side, the 21st lens surface corrects off-axial aberrations such as a coma on the wide angle side, and the 26th lens surface corrects a spherical aberration on the telephoto side.

Figure 9:
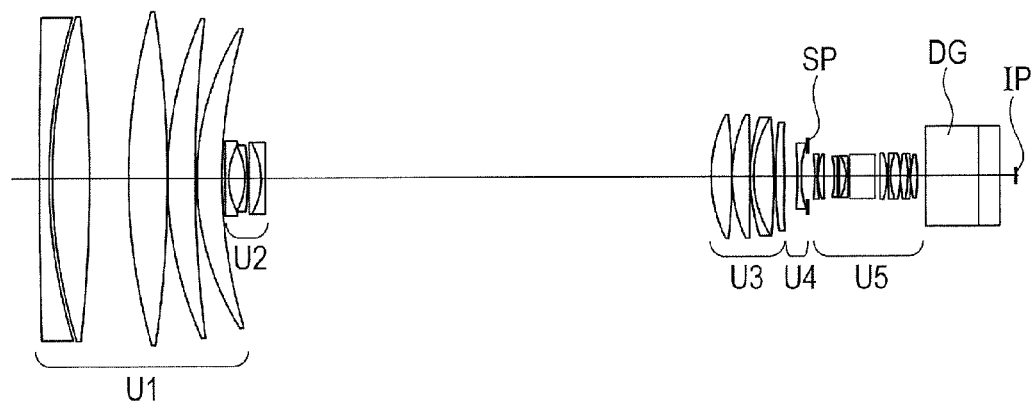
FIG. 9 is a lens cross-sectional view of a zoom lens at the wide angle end according to Embodiment 5.
Figure 10A:
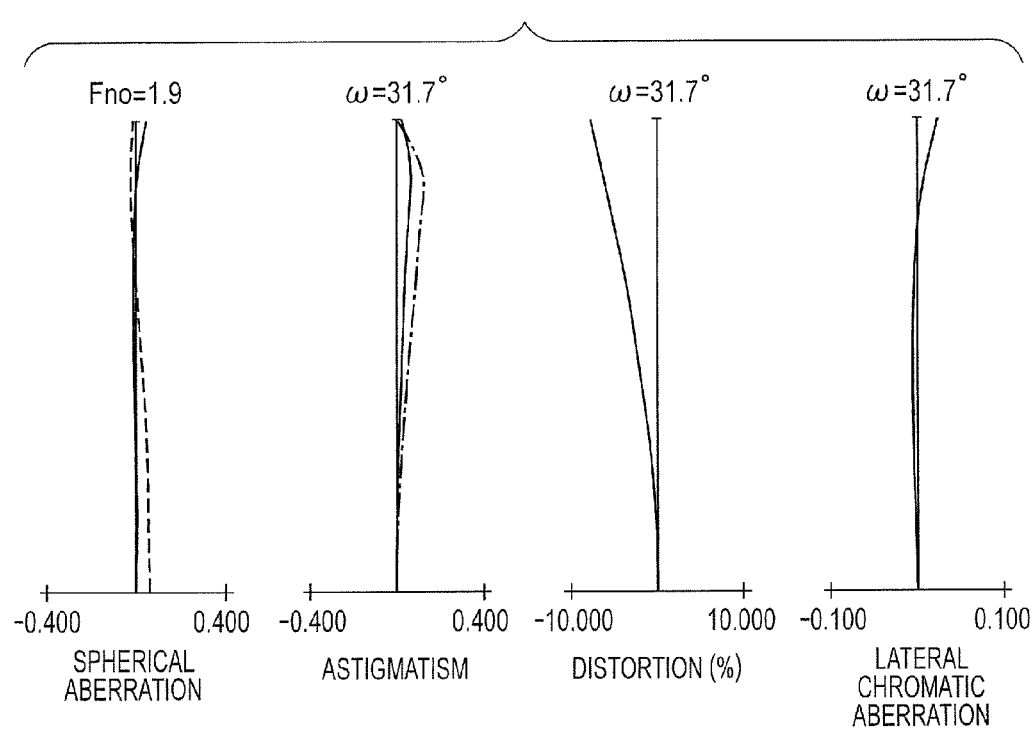
FIG. 10A is an aberration diagram at the wide angle end according to Embodiment 5.
Figure 10B:
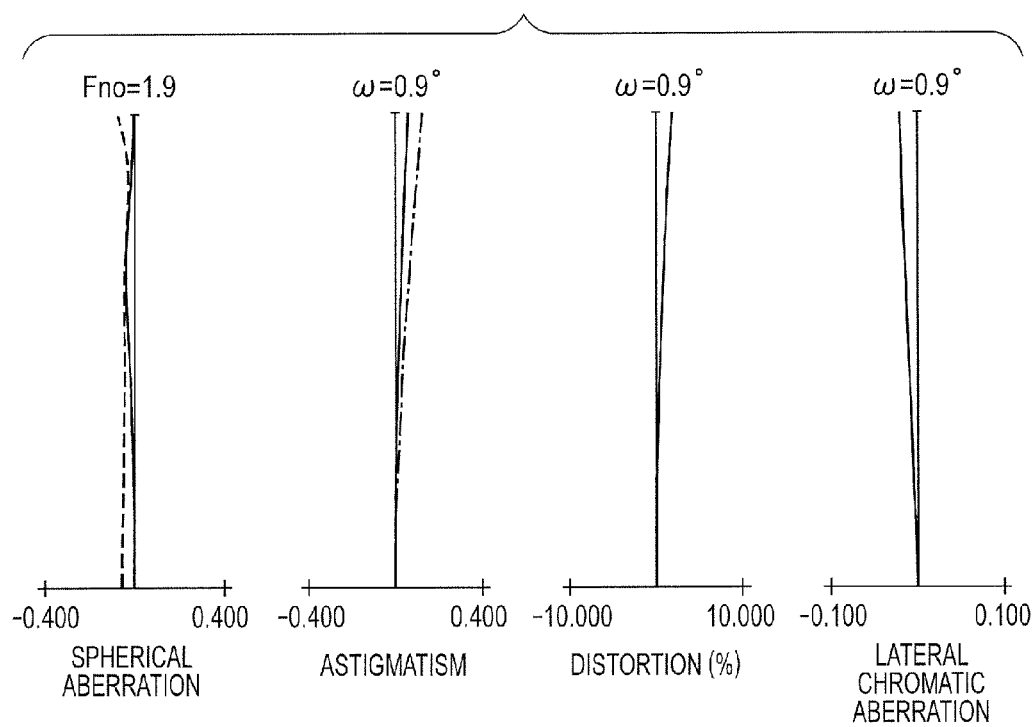
FIG. 10B is an aberration diagram at a focal length of 350 mm according to Embodiment 5.
Figure 10C:
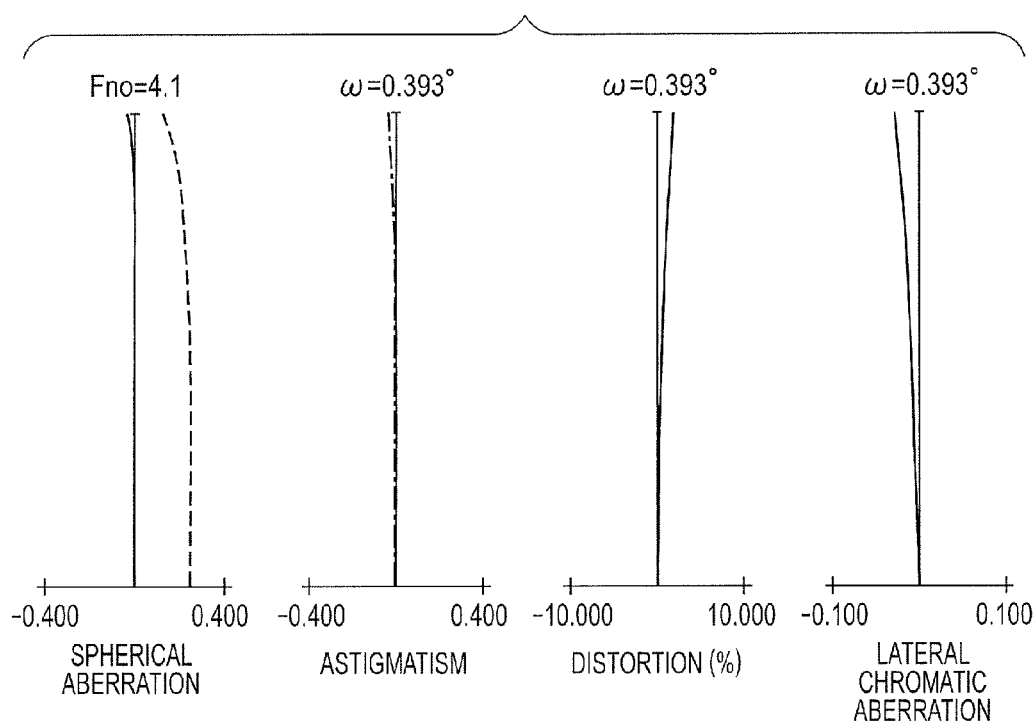
FIG. 10C is an aberration diagram at the telephoto end according to Embodiment 5.

FIG. 9 is a lens cross-sectional view when focused on an object at infinity at the wide angle end according to Numerical Embodiment 5 as Embodiment 5 of the present invention. FIGS. 10A, 10B, and 10C are longitudinal aberration diagrams when focused on the object at infinity at the wide angle end, f=350 mm, and the telephoto end according to Numerical Embodiment 5, respectively.

This embodiment, in which the fourth lens unit is composed of one negative lens, satisfies all the conditional expressions as shown in Table 1 to achieve the excellent optical performance. In addition, the wide angle of field and the high zoom ratio are achieved with a focal length at the wide angle end of 8.9 mm and a zoom ratio of 90, and the size and weight are reduced with the lens diameter of the third lens unit U3 at the end on the object side of 73.75 mm.

Embodiment 6

A description is given of the second lens unit U2, the third lens unit U3, and the fourth lens unit U4, which are lens units which move during zooming in Embodiment 6 corresponding to Numerical Embodiment 6 to be described later. The second lens unit U2 corresponds to the 11th to 17th lens surfaces in Numerical Embodiment 6, and includes, in order from the object side to the image side, two negative lenses and a cemented lens formed by cementing a positive lens and a negative lens in the stated order.

The third lens unit U3 corresponds to the 18th to 25th lens surfaces in Numerical Embodiment 6, and includes, in order from the object side to the image side, two positive lenses, a negative lens, and a positive lens.

The fourth lens unit U4 corresponds to the 26th to 28th lens surfaces in Numerical Embodiment 6, and includes, in order from the object side to the image side, a cemented lens formed by cementing a negative lens and a positive lens in the stated order.

The aspherical surfaces are used for the 11th, 18th, and 25th lens surfaces. The 11th lens surface mainly corrects a distortion on the wide angle side, the 18th lens surface corrects off-axial aberrations such as a coma on the wide angle side, and the 25th lens surface corrects a spherical aberration on the telephoto side.

Figure 11:
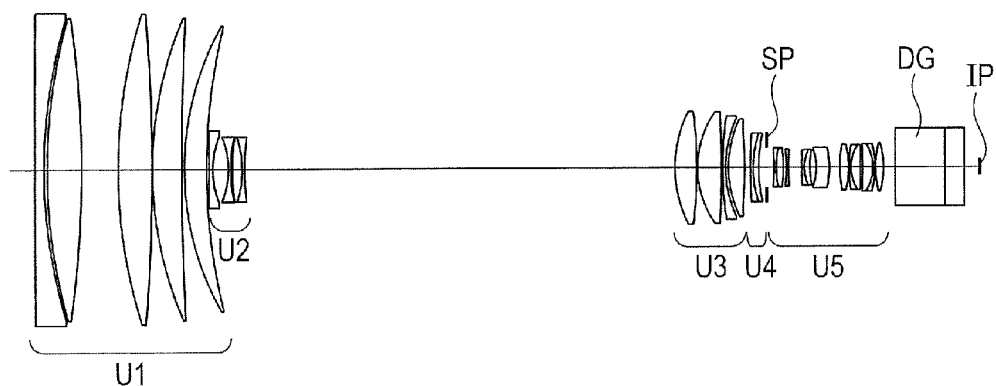
FIG. 11 is a lens cross-sectional view of a zoom lens at the wide angle end according to Embodiment 6.
Figure 12A:
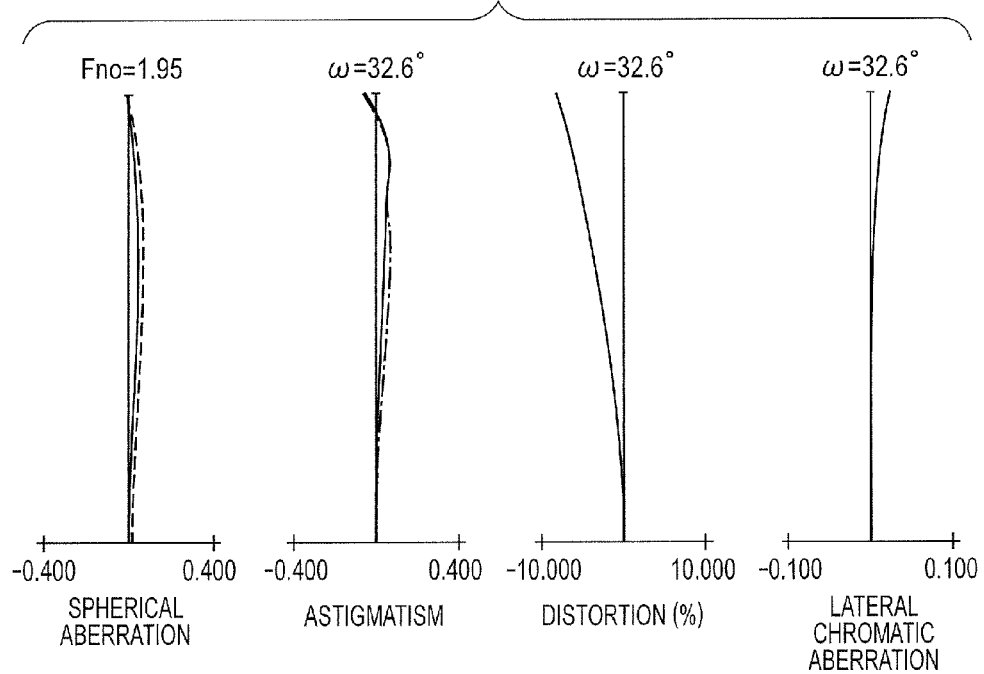
FIG. 12A is an aberration diagram at the wide angle end according to Embodiment 6.
Figure 12B:
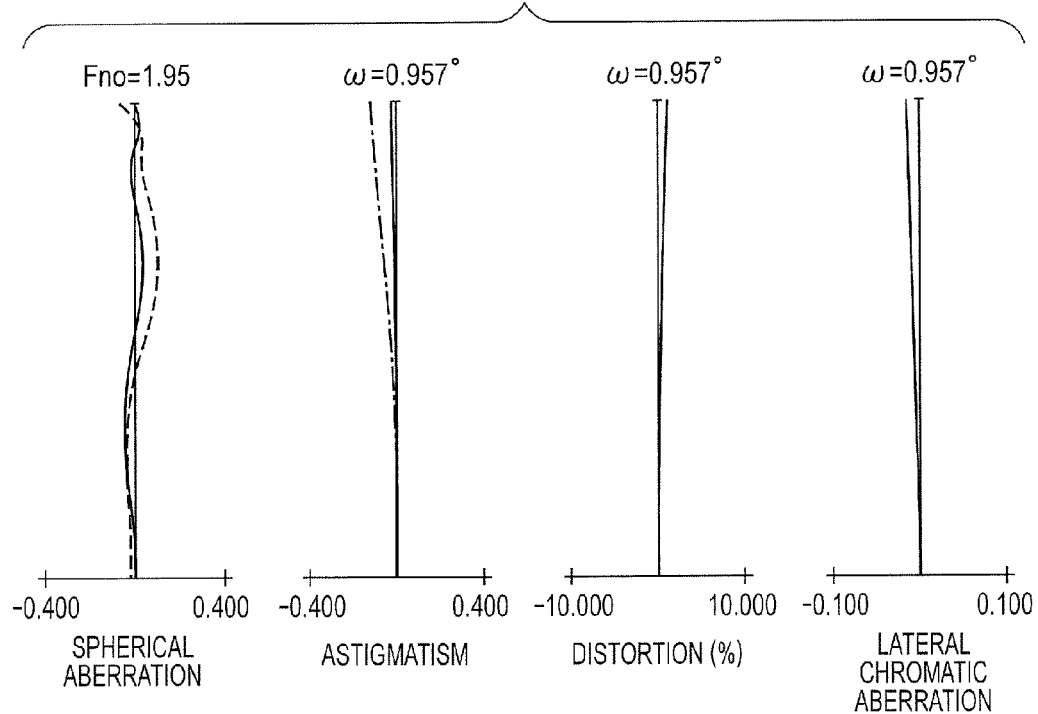
FIG. 12B is an aberration diagram at a focal length of 329 mm according to Embodiment 6.
Figure 12C:
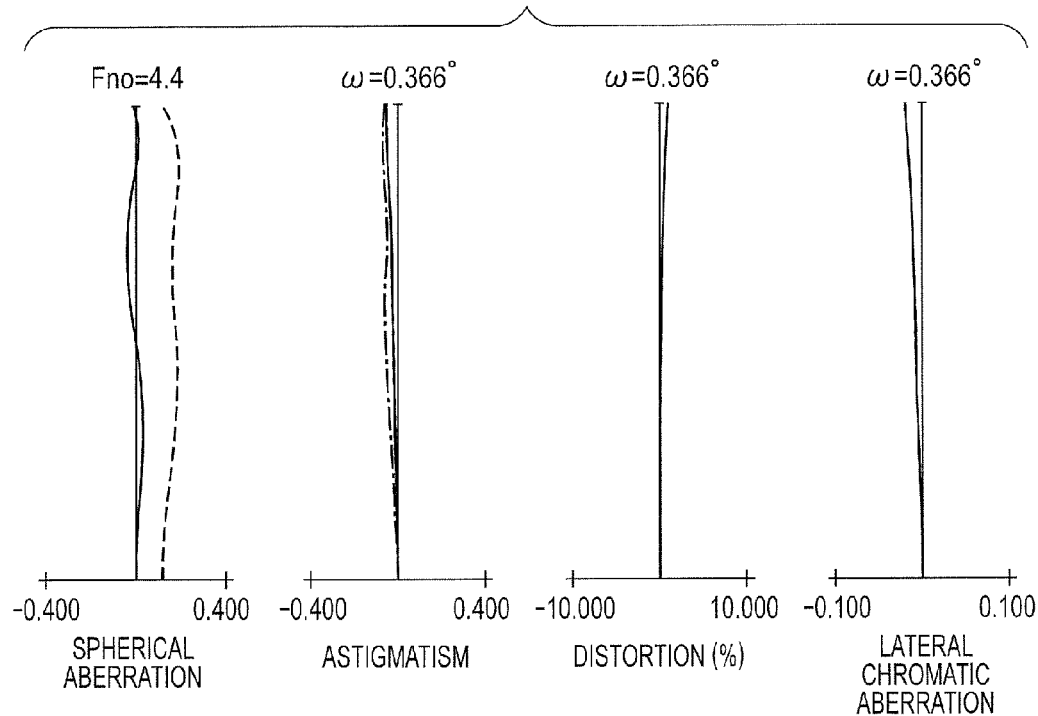
FIG. 12C is an aberration diagram at the telephoto end according to Embodiment 6.

FIG. 11 is a lens cross-sectional view when focused on an object at infinity at the wide angle end according to Numerical Embodiment 6 as Embodiment 6 of the present invention. FIGS. 12A, 12B, and 12C are longitudinal aberration diagrams when focused on the object at infinity at the wide angle end, f=329 mm, and the telephoto end according to Numerical Embodiment 6, respectively.

Corresponding values of the conditional expressions in this embodiment are shown in Table 1. This numerical embodiment satisfies all the conditional expressions to achieve the wide angle of field and the high zoom ratio with a focal length of 8.6 mm at the wide angle end and a zoom ratio of 100 and to reduce the size and weight with the lens diameter of the third lens unit U3 at the end on the object side of 73.79 mm, while achieving excellent optical performance.

Embodiment 7

A description is given of the second lens unit U2, the third lens unit U3, and the fourth lens unit U4, which are lens units which move during zooming in Embodiment 7 corresponding to Numerical Embodiment 7 to be described later. The second lens unit U2 corresponds to the 11th to 17th lens surfaces in Numerical Embodiment 7, and includes, in order from the object side to the image side, two negative lenses and a cemented lens formed by cementing a positive lens and a negative lens in the stated order.

The third lens unit U3 corresponds to the 18th to 26th lens surfaces in Numerical Embodiment 7, and includes, in order from the object side to the image side, two positive lenses, a cemented lens formed by cementing a positive lens and a negative lens in the stated order, and a positive lens.

The fourth lens unit U4 corresponds to the 27th to 29th lens surfaces in Numerical Embodiment 7, and includes, in order from the object side to the image side, a cemented lens formed by cementing a negative lens and a positive lens in the stated order.

The aspherical surfaces are used for the 11th, 18th, and 26th lens surfaces. The 11th lens surface mainly corrects a distortion on the wide angle side, the 18th lens surface corrects off-axial aberrations such as a coma on the wide angle side, and the 26th lens surface corrects a spherical aberration on the telephoto side.

Figure 13:
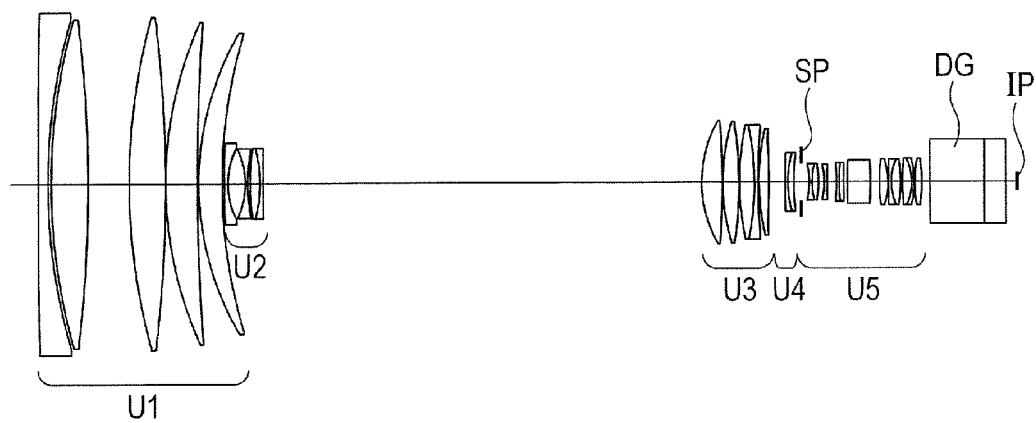
FIG. 13 is a lens cross-sectional view of a zoom lens at the wide angle end according to Embodiment 7.
Figure 14A:
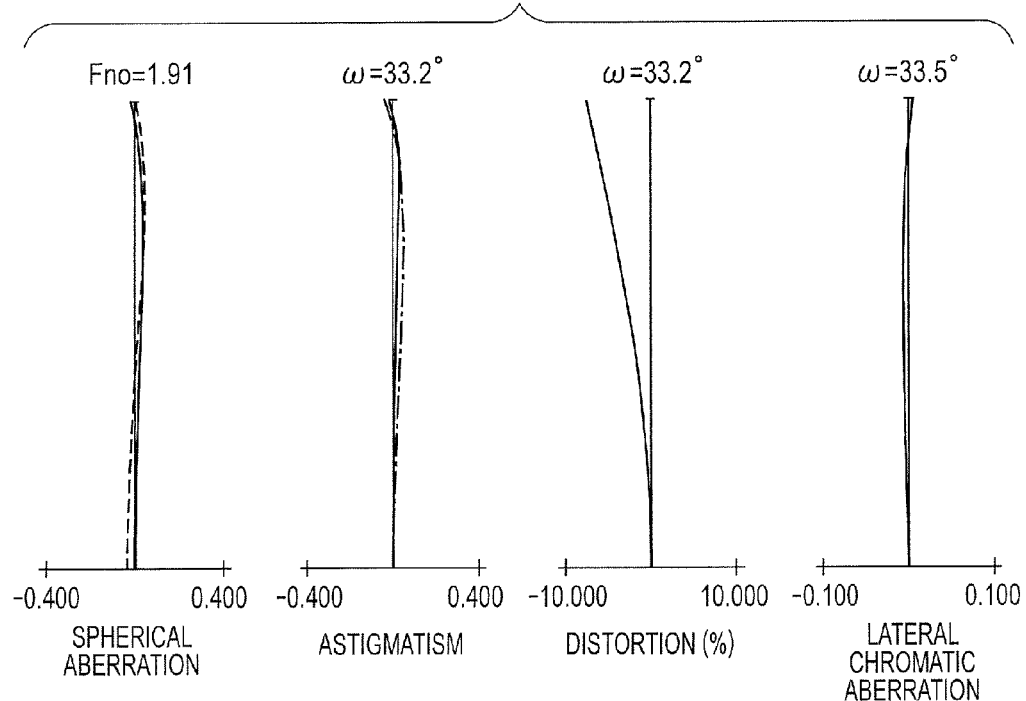
FIG. 14A is an aberration diagram at the wide angle end according to Embodiment 7.
Figure 14B:
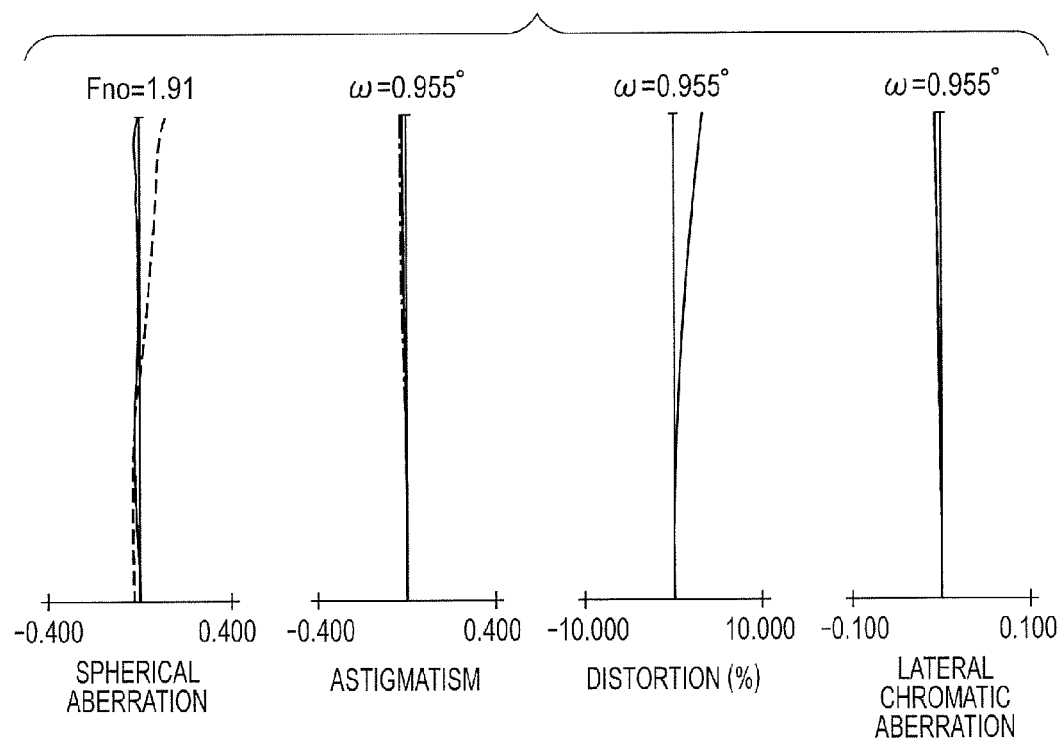
FIG. 14B is an aberration diagram at a focal length of 330 mm according to Embodiment 7.
Figure 14C:
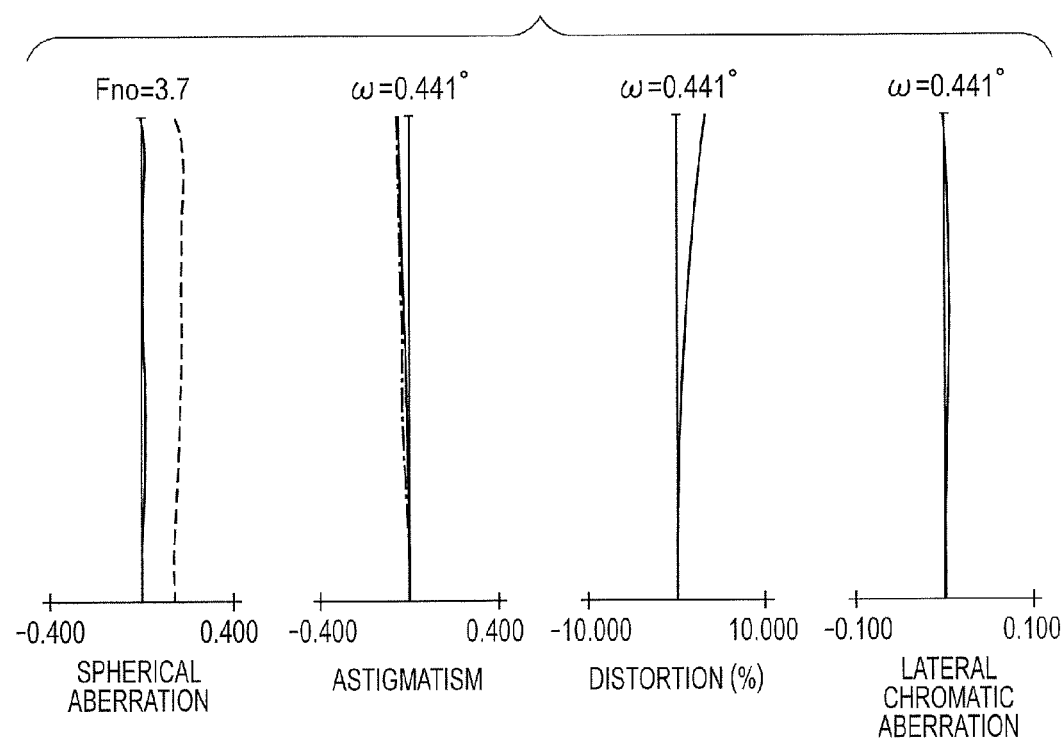
FIG. 14C is an aberration diagram at the telephoto end according to Embodiment 7.

FIG. 13 is a lens cross-sectional view when focused on an object at infinity at the wide angle end according to Numerical Embodiment 7 as Embodiment 7 of the present invention. FIGS. 14A, 14B, and 14C are longitudinal aberration diagrams when focused on the object at infinity at the wide angle end, f=330 mm, and the telephoto end according to Numerical Embodiment 7, respectively.

Corresponding values of the conditional expressions in this embodiment are shown in Table 1. This numerical embodiment satisfies all the conditional expressions to achieve the wide angle of field and the high zoom ratio with a focal length of 8.4 mm at the wide angle end and a zoom ratio of 85 and to reduce the size and weight with the lens diameter of the third lens unit U3 at the end on the object side of 73.13 mm, while achieving excellent optical performance.

Figure 19:
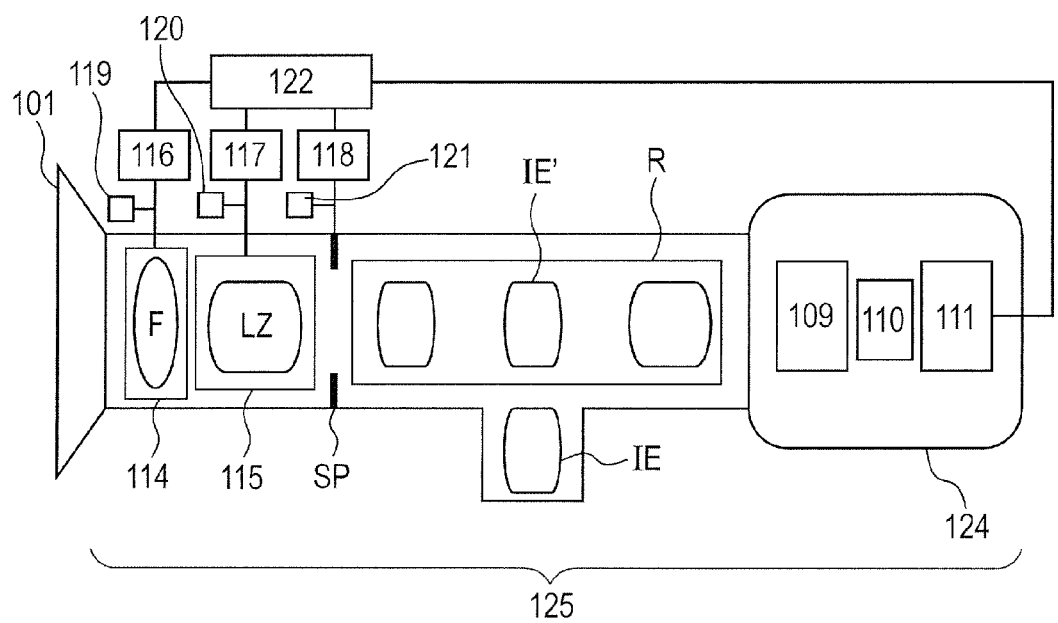
FIG. 19 is a schematic diagram of a main part of an image pickup apparatus according to the present invention.

FIG. 19 is a schematic diagram of a main part of an image pickup apparatus (television camera system) using the zoom lens according to each of Embodiments 1 to 7 of the present invention as a photographing optical system. In FIG. 19, an image pickup apparatus 124 includes a zoom lens 101 according to any one of Embodiments 1 to 7, and a camera 124. The zoom lens 101 is removably attached to the camera 124. The camera 124 attached with the zoom lens 101 constitutes the image pickup apparatus 125. The zoom lens 101 includes a first lens unit F, a zoom portion LZ, and a fifth lens unit R for imaging. The first lens unit F includes a lens unit for focusing.

The zoom portion LZ includes the second lens unit and the third lens unit which move on the optical axis for zooming, and the fourth lens unit which moves on the optical axis for correcting the image plane variation accompanying the zooming. The aperture stop is denoted by SP. The fifth lens unit R includes lens units IE' and IE which can be inserted into and removed from an optical path. The lens units IE and IE' are switched to displace the focal length range of the entire system of the zoom lens 101. Drive mechanisms 114 and 115, such as a helicoid and a cam, drive the first lens unit F and the zoom portion LZ in an optical axis direction, respectively. Motors (drive units) 116 to 118 electrically drive the drive mechanisms 114 and 115 and the aperture stop SP.

Detectors 119 to 121, such as an encoder, a potentiometer, or a photo-sensor, are configured to detect the positions of the first lens unit F and the zoom portion LZ on the optical axis, and the aperture diameter of the aperture stop SP. The camera 124 includes a glass block 109, which corresponds to an optical filter or a color separation optical system provided within the camera 124. Further, the camera 124 includes a solid state image pickup element (photoelectric transducer) 110, such as a charge-coupled device (CCD) sensor or a complementary metal-oxide semiconductor (CMOS) sensor. The solid state image pickup element 110 is configured to receive a subject image formed by the zoom lens 101. Further, central processing units (CPUs) 111 and 122 control the driving of the camera 124 and the zoom lens 101.

By applying the zoom lens according to the present invention to a television camera as described above, an image pickup apparatus having a high optical performance may be realized.

The exemplary embodiments of the present invention are described above, but the present invention is not limited to these embodiments and can be modified and changed variously within the scope of the gist thereof.

Next, Numerical Embodiments 1 to 7 corresponding to Embodiments 1 to 7 of the present invention are shown below. In each of the numerical embodiments, represents the order of a surface from the object side, "ri" represents a radius of curvature of an i-th surface from the object side, "di" represents an interval between the i-th surface and the (i+1)th surface from the object side, and "ndi" and "udi" respectively represent a refractive index and an Abbe constant of the i-th optical material. The final three surfaces include a glass block such as a filter. The focal length, the F-number, and the angle of field represent values when focused on the object at infinity. BF is an equivalent air value of a distance from the final surface of the glass block to the image plane.

Note that, the aspherical shape is expressed by the following expression:

$$X = (y^2/r)/\{1 + (1 - k \times y^2/r^2)^{0.5}\} + A4 \times y^4 + A6 \times y^6 + A8 \times y^8 + A10 \times y^{10} + A12 \times y^{12}$$

where X is a coordinate in the optical axis direction; y is a coordinate in a direction perpendicular to the optical axis; r is a standard radius of curvature; k is a conic constant; and An is an n-th order aspherical coefficient. "e-x" means "×10$^{-x}$". Note that, the lens surfaces having the aspherical surfaces are marked with asterisks (*) on the left side of surface numbers in the tables.

Correspondences between the embodiments and the conditional expressions described above are shown in Table 1.

(Numerical Embodiment 1)
Unit mm

Surface data

| Surface number | r | d | nd | vd | Effective diameter |
|---|---|---|---|---|---|
| 1 | 6632.596 | 6.00 | 1.83400 | 37.2 | 203.68 |
| 2 | 334.796 | 2.00 | | | 204.06 |
| 3 | 343.280 | 25.00 | 1.43387 | 95.1 | 205.17 |
| 4 | −780.988 | 25.00 | | | 205.70 |
| 5 | 369.958 | 26.50 | 1.43387 | 95.1 | 210.16 |
| 6 | −705.086 | 0.10 | | | 209.99 |
| 7 | 221.685 | 19.00 | 1.43387 | 95.1 | 203.29 |
| 8 | 668.299 | 1.48 | | | 202.39 |
| 9 | 198.633 | 16.50 | 1.49700 | 81.5 | 192.89 |
| 10 | 403.481 | (Variable) | | | 190.83 |
| 11* | −491.871 | 2.20 | 2.00330 | 28.3 | 43.47 |
| 12 | 47.800 | 8.30 | | | 38.48 |
| 13 | −53.712 | 1.45 | 1.88300 | 40.8 | 37.97 |
| 14 | 115.319 | 0.91 | | | 38.31 |
| 15 | 115.945 | 7.09 | 1.95906 | 17.5 | 38.70 |
| 16 | −58.404 | 2.20 | 1.77250 | 49.6 | 38.77 |
| 17 | 604.584 | (Variable) | | | 38.65 |
| 18* | 85.681 | 15.35 | 1.49700 | 81.5 | 81.09 |

(Numerical Embodiment 1)
Unit mm

| | | | | |
|---|---|---|---|---|
| 19 | −277.955 | 0.50 | | 81.11 |
| 20 | 145.870 | 11.40 | 1.49700 81.5 | 79.84 |
| 21 | −226.294 | 0.10 | | 79.19 |
| 22 | 147.516 | 11.53 | 1.43875 94.9 | 73.92 |
| 23 | −171.258 | 1.95 | 1.84666 23.8 | 72.14 |
| 24 | 378.364 | 1.00 | | 69.58 |
| 25 | 127.931 | 6.51 | 1.49700 81.5 | 67.66 |
| 26* | −484.294 | (Variable) | | 66.47 |
| 27 | ∞ | 1.60 | 1.88300 40.8 | 47.48 |
| 28 | 68.461 | 4.70 | 1.80809 22.8 | 45.45 |
| 29 | 169.071 | (Variable) | | 44.63 |
| 30 (Stop) | ∞ | 5.00 | | 29.36 |
| 31 | −84.706 | 1.70 | 1.88300 40.8 | 27.68 |
| 32 | 68.204 | 4.55 | 1.80809 22.8 | 27.40 |
| 33 | −68.232 | 2.00 | | 27.31 |
| 34 | −38.899 | 1.80 | 1.88300 40.8 | 26.87 |
| 35 | 45.379 | 4.50 | 1.80809 22.8 | 27.65 |
| 36 | 492.460 | 7.00 | | 28.04 |
| 37 | −287.220 | 2.00 | 1.72047 34.7 | 30.15 |
| 38 | 28.523 | 10.52 | 1.51633 64.1 | 31.85 |
| 39 | −49.127 | 0.20 | | 33.21 |
| 40 | 970.953 | 16.24 | 1.62041 60.3 | 34.43 |
| 41 | −188.388 | 5.00 | | 37.69 |
| 42 | 94.144 | 9.07 | 1.53172 48.8 | 39.50 |
| 43 | −44.166 | 1.00 | | 39.49 |
| 44 | 146.691 | 2.00 | 1.88300 40.8 | 35.36 |
| 45 | 27.695 | 10.32 | 1.51633 64.1 | 32.64 |
| 46 | −139.287 | 1.00 | | 31.79 |
| 47 | −195.214 | 5.65 | 1.48749 70.2 | 31.21 |
| 48 | −55.200 | 2.00 | 1.83400 37.2 | 30.21 |
| 49 | −100.099 | 1.20 | | 29.96 |
| 50 | 184.987 | 4.00 | 1.48749 70.2 | 28.75 |
| 51 | −249.083 | 10.00 | | 27.73 |
| 52 | ∞ | 33.00 | 1.60859 46.4 | 60.00 |
| 53 | ∞ | 13.20 | 1.51633 64.2 | 60.00 |
| 54 | ∞ | 10.00 | | 60.00 |
| Image plane | ∞ | | | |

Aspherical surface data

Eleventh surface

K = 3.87001e−008   A4 = 5.69989e−007   A6 = 1.81982e−010
A8 = −9.29556e−013   A10 = 2.42966e−015   A12 = −2.23609e−018

Eighteenth surface

K = 0.00000e+000   A4 = 3.41822e−008   A6 = 3.56974e−011
A8 = −3.98779e−014   A10 = 1.66029e−017   A12 = −3.66398e−021

Twenty-sixth surface

K = 0.00000e+000   A4 = 1.07577e−006   A6 = 2.28913e−010
A8 = −2.56816e−013   A10 = 2.63089e−016   A12 = −7.95027e−020

Various data
Zoom ratio 120.00

| | Wide angle | Intermediate | Telephoto |
|---|---|---|---|
| Focal length | 9.00 | 301.67 | 1080.01 |
| F-number | 1.92 | 1.92 | 5.32 |
| Half angle of field | 31.43 | 1.04 | 0.29 |
| Image height | 5.50 | 5.50 | 5.50 |
| Total lens length | 651.84 | 651.84 | 651.84 |
| BF | 10.00 | 10.00 | 10.00 |
| d10 | 1.50 | 176.62 | 190.82 |
| d17 | 280.94 | 55.70 | 1.98 |
| d26 | 4.53 | 54.24 | 58.59 |
| d29 | 3.54 | 3.95 | 39.12 |
| Incident pupil position | 129.46 | 2835.85 | 18212.38 |
| Exit pupil position | 627.22 | 627.22 | 627.22 |
| Front principal point position | 138.59 | 3284.97 | 21182.18 |
| Rear principal point position | 1.00 | −291.67 | −1070.01 |
| β1 | 0.00 | 0.00 | 0.00 |
| β2 | −0.13 | −1.06 | −2.58 |
| β3 | −0.25 | −1.00 | −1.30 |
| β4 | 1.43 | 1.43 | 1.64 |
| β5 | 0.79 | 0.79 | 0.79 |

Zoom lens unit data

| Unit | First surface | Focal length | Lens structure length | Front principal point position | Rear principal point position |
|---|---|---|---|---|---|
| 1 | 1 | 250.00 | 121.58 | 68.42 | −20.06 |
| 2 | 11 | −25.70 | 22.15 | 3.44 | −12.14 |
| 3 | 18 | 66.00 | 48.34 | 10.92 | −23.49 |
| 4 | 27 | −170.00 | 6.30 | 2.97 | −0.46 |
| 5 | 30 | 51.22 | 152.95 | 55.76 | −0.83 |

Single lens data

| Lens | First surface | Focal length |
|---|---|---|
| 1 | 1 | −420.28 |
| 2 | 3 | 551.96 |
| 3 | 5 | 562.05 |
| 4 | 7 | 752.94 |
| 5 | 9 | 764.42 |
| 6 | 11 | −42.97 |
| 7 | 13 | −41.09 |
| 8 | 15 | 40.78 |
| 9 | 16 | −68.52 |
| 10 | 18 | 133.26 |
| 11 | 20 | 179.77 |
| 12 | 22 | 182.19 |
| 13 | 23 | −137.66 |
| 14 | 25 | 203.75 |
| 15 | 27 | −77.13 |
| 16 | 28 | 138.02 |
| 17 | 31 | −42.32 |
| 18 | 32 | 42.41 |
| 19 | 34 | −23.35 |
| 20 | 35 | 60.95 |
| 21 | 37 | −35.67 |
| 22 | 38 | 36.51 |
| 23 | 40 | 254.68 |
| 24 | 42 | 57.58 |
| 25 | 44 | −38.75 |
| 26 | 45 | 45.54 |
| 27 | 47 | 155.28 |
| 28 | 48 | −149.67 |
| 29 | 50 | 217.67 |
| 30 | 52 | 0.00 |
| 31 | 53 | 0.00 |

(Numerical Embodiment 2)
Unit mm

Surface data

| Surface number | r | d | nd | vd | Effective diameter |
|---|---|---|---|---|---|
| 1 | 5330.746 | 6.00 | 1.83400 | 37.2 | 207.64 |
| 2 | 338.681 | 2.00 | | | 197.25 |
| 3 | 342.673 | 24.50 | 1.43387 | 95.1 | 196.47 |
| 4 | −679.315 | 24.51 | | | 194.91 |
| 5 | 324.458 | 23.00 | 1.43387 | 95.1 | 198.58 |
| 6 | −1112.693 | 0.10 | | | 198.19 |
| 7 | 265.263 | 16.00 | 1.43387 | 95.1 | 192.61 |
| 8 | 915.734 | 1.00 | | | 191.50 |
| 9 | 188.489 | 16.00 | 1.49700 | 81.5 | 182.25 |
| 10 | 391.195 | (Variable) | | | 180.25 |
| 11* | −731.335 | 2.20 | 2.00330 | 28.3 | 46.44 |

-continued (Numerical Embodiment 2)
Unit mm

| | | | | |
|---|---|---|---|---|
| 12 | 46.185 | 10.50 | | 40.19 |
| 13 | −39.331 | 1.50 | 1.77250 | 49.6 | 39.71 |
| 14 | 77.076 | 1.50 | | 40.68 |
| 15 | 121.994 | 6.80 | 1.95906 | 17.5 | 41.01 |
| 16 | −80.720 | 2.00 | 1.75500 | 52.3 | 41.35 |
| 17 | −150.693 | (Variable) | | 41.67 |
| 18 | 58.511 | 13.00 | 1.49700 | 81.5 | 74.75 |
| 19* | 249.550 | 0.25 | | 74.39 |
| 20 | 71.594 | 13.20 | 1.43875 | 94.9 | 72.01 |
| 21 | −910.827 | 0.35 | | 70.47 |
| 22 | 641.700 | 2.00 | 1.84666 | 23.8 | 68.77 |
| 23 | 98.964 | 1.20 | | 65.46 |
| 24 | 69.849 | 11.00 | 1.49700 | 81.5 | 64.32 |
| 25* | −122.193 | (Variable) | | 63.03 |
| 26 | 155.414 | 1.40 | 1.88300 | 40.8 | 42.33 |
| 27 | 42.266 | 4.50 | 1.80809 | 22.8 | 39.96 |
| 28 | 75.275 | (Variable) | | 39.03 |
| 29 (Stop) | ∞ | 5.00 | | 27.07 |
| 30 | −55.430 | 1.40 | 1.88300 | 40.8 | 25.71 |
| 31 | 49.096 | 5.10 | 1.80809 | 22.8 | 25.83 |
| 32 | −83.068 | 3.00 | | 25.95 |
| 33 | −1015.869 | 3.30 | 1.80809 | 22.8 | 25.27 |
| 34 | −85.361 | 1.70 | 1.88300 | 40.8 | 25.07 |
| 35 | 59.434 | 4.00 | | 24.80 |
| 36 | −114.183 | 2.00 | 1.72047 | 34.7 | 25.31 |
| 37 | 59.699 | 9.00 | 1.51633 | 64.1 | 26.32 |
| 38 | −81.574 | 0.20 | | 28.47 |
| 39 | 970.953 | 14.00 | 1.62041 | 60.3 | 28.99 |
| 40 | −113.147 | 4.00 | | 31.47 |
| 41 | 103.807 | 6.33 | 1.54072 | 47.2 | 32.35 |
| 42 | −79.463 | 1.00 | | 32.28 |
| 43 | 91.014 | 2.00 | 1.88300 | 40.8 | 31.22 |
| 44 | 34.294 | 7.30 | 1.51633 | 64.1 | 29.98 |
| 45 | −326.746 | 1.00 | | 29.46 |
| 46 | 61.735 | 6.85 | 1.51633 | 64.1 | 28.63 |
| 47 | −94.902 | 2.00 | 1.83400 | 37.2 | 27.20 |
| 48 | 53.141 | 0.85 | | 26.15 |
| 49 | 49.200 | 5.34 | 1.51633 | 64.1 | 26.15 |
| 50 | −54.182 | 5.00 | | 25.78 |
| 51 | ∞ | 33.00 | 1.60859 | 46.4 | 60.00 |
| 52 | ∞ | 13.20 | 1.51633 | 64.2 | 60.00 |
| 53 | ∞ | 10.00 | | 60.00 |
| Image plane | ∞ | | | |

Aspherical surface data

Eleventh surface

K = −1.93036e−009    A4 = 1.73888e−006    A6 = −2.78365e−011
A8 = 2.54877e−013    A10 = 1.62184e−016    A12 = 3.58419e−019

Nineteenth surface

K = 0.00000e+000    A4 = 1.65947e−007    A6 = −5.21983e−010
A8 = 1.08264e−013    A10 = −1.63677e−017    A12 = 7.15837e−021

Twenty-fifth surface

K = 0.00000e+000    A4 = 2.57890e−006    A6 = 7.03629e−010
A8 = 9.74103e−014    A10 = −3.76977e−016    A12 = 3.67830e−019

Various data
Zoom ratio 100.00

| | Wide angle | Intermediate | Telephoto |
|---|---|---|---|
| Focal length | 8.50 | 300.01 | 850.00 |
| F-number | 1.89 | 1.89 | 4.40 |
| Half angle of field | 32.91 | 1.05 | 0.37 |
| Image height | 5.50 | 5.50 | 5.50 |
| Total lens length | 622.09 | 622.09 | 622.09 |
| BF | 10.00 | 10.00 | 10.00 |
| d10 | 2.91 | 179.16 | 188.63 |
| d17 | 276.47 | 50.88 | 2.00 |
| d25 | 5.50 | 45.82 | 76.23 |
| d28 | 6.13 | 15.15 | 24.16 |
| Incident pupil position | 126.02 | 3175.40 | 13497.28 |
| Exit pupil position | 559.80 | 559.80 | 559.80 |
| Front principal point position | 134.66 | 3639.12 | 15661.40 |
| Rear principal point position | 1.50 | −290.01 | −840.00 |
| β1 | 0.00 | 0.00 | 0.00 |
| β2 | −0.13 | −1.19 | −2.07 |
| β3 | −0.24 | −0.92 | −1.45 |
| β4 | 1.50 | 1.56 | 1.62 |
| β5 | 0.70 | 0.70 | 0.70 |

Zoom lens unit data

| Unit | First surface | Focal length | Lens structure length | Front principal point position | Rear principal point position |
|---|---|---|---|---|---|
| 1 | 1 | 250.00 | 113.11 | 63.89 | −19.11 |
| 2 | 11 | −26.50 | 24.50 | 2.99 | −15.96 |
| 3 | 18 | 65.00 | 41.00 | 10.56 | −20.07 |
| 4 | 26 | −150.00 | 5.90 | 5.43 | 2.13 |
| 5 | 29 | 46.52 | 136.57 | 50.70 | −3.87 |

Single lens data

| Lens | First surface | Focal length |
|---|---|---|
| 1 | 1 | −431.13 |
| 2 | 3 | 527.50 |
| 3 | 5 | 580.36 |
| 4 | 7 | 852.20 |
| 5 | 9 | 711.10 |
| 6 | 11 | −42.88 |
| 7 | 13 | −33.36 |
| 8 | 15 | 50.82 |
| 9 | 16 | −232.07 |
| 10 | 18 | 149.94 |
| 11 | 20 | 151.53 |
| 12 | 22 | −137.08 |
| 13 | 24 | 90.90 |
| 14 | 26 | −65.75 |
| 15 | 27 | 111.24 |
| 16 | 30 | −29.13 |
| 17 | 31 | 38.46 |
| 18 | 33 | 113.96 |
| 19 | 34 | −39.23 |
| 20 | 36 | −53.78 |
| 21 | 37 | 67.99 |
| 22 | 39 | 163.51 |
| 23 | 41 | 83.84 |
| 24 | 43 | −63.01 |
| 25 | 44 | 60.30 |
| 26 | 46 | 73.27 |
| 27 | 47 | −40.34 |
| 28 | 49 | 50.65 |
| 29 | 51 | 0.00 |
| 30 | 52 | 0.00 |

(Numerical Embodiment 3)
Unit mm

Surface data

| Surface number | r | d | nd | vd | Effective diameter |
|---|---|---|---|---|---|
| 1 | 7630.626 | 6.00 | 1.83400 | 37.2 | 212.90 |
| 2 | 337.510 | 2.00 | | | 205.36 |
| 3 | 359.935 | 25.80 | 1.43387 | 95.1 | 205.26 |
| 4 | −629.848 | 24.58 | | | 204.62 |
| 5 | 293.049 | 23.40 | 1.43387 | 95.1 | 201.07 |
| 6 | −1627.680 | 0.10 | | | 200.80 |

(Numerical Embodiment 3)
Unit mm

| | | | | | |
|---|---|---|---|---|---|
| 7 | 268.549 | 16.00 | 1.43387 | 95.1 | 196.19 |
| 8 | 958.865 | 1.00 | | | 195.27 |
| 9 | 198.948 | 16.10 | 1.49700 | 81.5 | 186.23 |
| 10 | 453.267 | (Variable) | | | 184.63 |
| 11* | −533.583 | 2.20 | 2.00330 | 28.3 | 48.74 |
| 12 | 44.102 | 10.87 | | | 42.28 |
| 13 | −51.993 | 1.50 | 1.77250 | 49.6 | 41.65 |
| 14 | 107.645 | 7.00 | 1.95906 | 17.5 | 42.40 |
| 15 | −78.251 | 1.55 | | | 42.49 |
| 16 | −55.414 | 2.00 | 1.75500 | 52.3 | 42.35 |
| 17 | −143.977 | (Variable) | | | 42.81 |
| 18 | 63.236 | 13.20 | 1.49700 | 81.5 | 71.88 |
| 19* | 342.849 | 0.10 | | | 71.42 |
| 20 | 74.271 | 13.34 | 1.49700 | 81.5 | 69.50 |
| 21 | −411.922 | 0.10 | | | 67.83 |
| 22 | 193.040 | 7.17 | 1.49700 | 81.5 | 64.07 |
| 23 | −226.857 | 2.00 | 1.84666 | 23.8 | 62.43 |
| 24 | 188.069 | 1.00 | | | 59.24 |
| 25 | 204.799 | 5.20 | 1.49700 | 81.5 | 58.75 |
| 26* | −148.261 | (Variable) | | | 57.31 |
| 27 | −341.690 | 1.40 | 1.88300 | 40.8 | 39.54 |
| 28 | 58.789 | 5.00 | 1.80809 | 22.8 | 38.20 |
| 29 | 290.522 | (Variable) | | | 37.61 |
| 30 (Stop) | ∞ | 5.00 | | | 29.09 |
| 31 | −42.293 | 1.40 | 1.88300 | 40.8 | 28.22 |
| 32 | 697.162 | 4.65 | 1.80809 | 22.8 | 28.85 |
| 33 | −49.457 | 1.00 | | | 29.24 |
| 34 | 311.839 | 3.73 | 1.80809 | 22.8 | 28.53 |
| 35 | 1114.949 | 1.75 | 1.88300 | 40.8 | 28.00 |
| 36 | 69.569 | 5.00 | | | 27.55 |
| 37 | −32247.120 | 5.00 | 1.62004 | 36.3 | 27.84 |
| 38 | 98.528 | 3.00 | | | 28.14 |
| 39 | 970.953 | 14.00 | 1.62041 | 60.3 | 28.70 |
| 40 | −66.380 | 6.00 | | | 30.53 |
| 41 | ∞ | 4.19 | 1.48749 | 70.2 | 30.16 |
| 42 | −96.079 | 1.00 | | | 30.06 |
| 43 | 106.112 | 1.80 | 1.88300 | 40.8 | 29.40 |
| 44 | 40.213 | 6.00 | 1.48749 | 70.2 | 28.59 |
| 45 | −592.879 | 1.00 | | | 28.25 |
| 46 | 241.888 | 5.80 | 1.48749 | 70.2 | 27.97 |
| 47 | −38.238 | 1.60 | 1.83400 | 37.2 | 27.52 |
| 48 | −185.566 | 0.45 | | | 27.60 |
| 49 | 92.328 | 5.91 | 1.48749 | 70.2 | 27.42 |
| 50 | −47.411 | 5.00 | | | 26.96 |
| 51 | ∞ | 33.00 | 1.60859 | 46.4 | 60.00 |
| 52 | ∞ | 13.20 | 1.51633 | 64.2 | 60.00 |
| 53 | ∞ | 12.00 | | | 60.00 |
| Image plane | ∞ | | | | |

Aspherical surface data

Eleventh surface

K = 6.02761e−008    A4 = 8.40969e−007    A6 = −5.28050e−012
A8 = −9.10004e−013    A10 = 1.96610e−015    A12 = −1.40301e−018

Nineteenth surface

K = 0.00000e+000    A4 = −2.61640e−007    A6 = −4.11879e−010
A8 = −6.95210e−016    A10 = 1.37735e−016    A12 = −3.50421e−020

Twenty-sixth surface

K = 0.00000e+000    A4 = 2.83507e−006    A6 = 1.23175e−009
A8 = −9.14652e−013    A10 = 1.21648e−015    A12 = −5.10523e−019

Various data
Zoom ratio 97.00

| | Wide angle | Intermediate | Telephoto |
|---|---|---|---|
| Focal length | 8.70 | 313.78 | 843.90 |
| F-number | 1.85 | 1.85 | 4.34 |
| Half angle of field | 32.30 | 1.00 | 0.37 |
| Image height | 5.50 | 5.50 | 5.50 |
| Total lens length | 614.41 | 614.41 | 614.41 |
| BF | 12.00 | 12.00 | 12.00 |
| d10 | 3.82 | 180.52 | 189.82 |
| d17 | 276.69 | 51.26 | 2.00 |
| d26 | 1.68 | 35.93 | 40.51 |
| d29 | 2.13 | 16.62 | 52.00 |
| Incident pupil position | 130.05 | 3268.10 | 13552.48 |
| Exit pupil position | −159416.52 | −159416.52 | −159416.52 |
| Front principal point position | 138.75 | 3581.27 | 14391.92 |
| Rear principal point position | 3.30 | −301.78 | −831.90 |
| β1 | 0.00 | 0.00 | 0.00 |
| β2 | −0.14 | −1.38 | −2.55 |
| β3 | −0.24 | −0.85 | −1.09 |
| β4 | 1.59 | 1.69 | 1.93 |
| β5 | 0.63 | 0.63 | 0.63 |

Zoom lens unit data

| Unit | First surface | Focal length | Lens structure length | Front principal point position | Rear principal point position |
|---|---|---|---|---|---|
| 1 | 1 | 250.00 | 114.98 | 66.08 | −17.85 |
| 2 | 11 | −28.00 | 25.12 | 3.33 | −15.21 |
| 3 | 18 | 65.00 | 42.11 | 8.10 | −21.71 |
| 4 | 27 | −150.00 | 6.40 | 1.61 | −1.87 |
| 5 | 30 | 53.63 | 129.48 | 53.61 | −7.77 |

Single lens data

| Lens | First surface | Focal length |
|---|---|---|
| 1 | 1 | −420.89 |
| 2 | 3 | 530.78 |
| 3 | 5 | 573.06 |
| 4 | 7 | 851.62 |
| 5 | 9 | 696.69 |
| 6 | 11 | −40.19 |
| 7 | 13 | −44.98 |
| 8 | 14 | 47.50 |
| 9 | 16 | −119.95 |
| 10 | 18 | 153.15 |
| 11 | 20 | 127.40 |
| 12 | 22 | 210.43 |
| 13 | 23 | −119.99 |
| 14 | 25 | 173.39 |
| 15 | 27 | −56.38 |
| 16 | 28 | 89.41 |
| 17 | 31 | −44.86 |
| 18 | 32 | 56.72 |
| 19 | 34 | 529.16 |
| 20 | 35 | −83.61 |
| 21 | 37 | −157.38 |
| 22 | 39 | 100.27 |
| 23 | 41 | 196.60 |
| 24 | 43 | −73.85 |
| 25 | 44 | 77.23 |
| 26 | 46 | 67.96 |
| 27 | 47 | −57.67 |
| 28 | 49 | 64.94 |
| 29 | 51 | 0.00 |
| 30 | 52 | 0.00 |

(Numerical Embodiment 4)
Unit mm

Surface data

| Surface number | r | d | nd | vd | Effective diameter |
|---|---|---|---|---|---|
| 1 | 4913.814 | 6.00 | 1.83400 | 37.2 | 199.78 |
| 2 | 360.389 | 2.50 | | | 195.41 |

(Numerical Embodiment 4)
Unit mm

| | | | | | |
|---|---|---|---|---|---|
| 3 | 376.370 | 23.10 | 1.43387 | 95.1 | 196.36 |
| 4 | −689.861 | 25.00 | | | 196.80 |
| 5 | 333.921 | 23.80 | 1.43387 | 95.1 | 200.71 |
| 6 | −938.930 | 0.10 | | | 200.31 |
| 7 | 241.759 | 16.60 | 1.43387 | 95.1 | 192.95 |
| 8 | 723.005 | 1.73 | | | 191.63 |
| 9 | 193.694 | 14.90 | 1.49700 | 81.5 | 181.82 |
| 10 | 384.161 | (Variable) | | | 179.77 |
| 11* | −158.566 | 2.20 | 2.00330 | 28.3 | 45.14 |
| 12 | 46.861 | 9.20 | | | 39.75 |
| 13 | −52.898 | 1.45 | 1.81600 | 46.6 | 39.32 |
| 14 | 104.705 | 1.30 | | | 40.28 |
| 15 | 113.759 | 6.05 | 1.95906 | 17.5 | 41.01 |
| 16 | −93.566 | 0.20 | | | 41.21 |
| 17 | −184.255 | 1.90 | 1.72916 | 54.7 | 40.89 |
| 18 | 890.239 | (Variable) | | | 40.77 |
| 19 | 66.065 | 13.10 | 1.49700 | 81.5 | 74.40 |
| 20 | 1879.479 | 0.10 | | | 74.14 |
| 21 | 83.098 | 2.00 | 1.80518 | 25.4 | 72.73 |
| 22 | 70.716 | 10.00 | 1.49700 | 81.5 | 71.06 |
| 23* | 470.946 | 0.10 | | | 70.28 |
| 24 | 315.071 | 2.00 | 1.76182 | 26.5 | 70.02 |
| 25 | 96.469 | 9.80 | 1.43875 | 94.9 | 67.59 |
| 26 | −339.388 | 0.75 | | | 66.95 |
| 27 | 172.661 | 5.45 | 1.49700 | 81.5 | 63.93 |
| 28* | −216.299 | (Variable) | | | 62.97 |
| 29 | 131.508 | 5.21 | 1.80809 | 22.8 | 36.46 |
| 30 | −96.000 | 1.40 | 1.88300 | 40.8 | 35.34 |
| 31 | 48.331 | (Variable) | | | 32.69 |
| 32 (Stop) | ∞ | 5.00 | | | 27.77 |
| 33 | −5810.445 | 1.40 | 1.88300 | 40.8 | 26.67 |
| 34 | 111.361 | 0.20 | | | 26.42 |
| 35 | 41.386 | 3.05 | 1.84666 | 23.8 | 26.41 |
| 36 | 101.744 | 7.00 | | | 25.88 |
| 37 | −39.026 | 1.40 | 1.85026 | 32.3 | 24.39 |
| 38 | −525.882 | 2.00 | | | 24.78 |
| 39 | −81.335 | 3.61 | 1.84666 | 23.8 | 24.99 |
| 40 | −33.597 | 1.80 | 1.78590 | 44.2 | 25.49 |
| 41 | −119.740 | 1.00 | | | 26.29 |
| 42 | ∞ | 14.89 | 1.67003 | 47.2 | 26.67 |
| 43 | −73.127 | 5.50 | | | 28.46 |
| 44 | −87.926 | 3.53 | 1.48749 | 70.2 | 28.21 |
| 45 | −38.785 | 0.70 | | | 28.36 |
| 46 | 279.862 | 1.60 | 1.80000 | 29.8 | 27.32 |
| 47 | 35.733 | 5.24 | 1.48749 | 70.2 | 26.56 |
| 48 | −128.445 | 0.20 | | | 26.42 |
| 49 | −275.505 | 4.65 | 1.51823 | 58.9 | 26.30 |
| 50 | −30.567 | 1.60 | 1.83400 | 37.2 | 26.08 |
| 51 | −57.078 | 0.20 | | | 26.31 |
| 52 | 43.842 | 3.86 | 1.48749 | 70.2 | 25.37 |
| 53 | 23531.071 | 5.00 | | | 24.63 |
| 54 | ∞ | 33.00 | 1.60859 | 46.4 | 60.00 |
| 55 | ∞ | 13.20 | 1.51633 | 64.2 | 60.00 |
| 56 | ∞ | 10.00 | | | 60.00 |
| Image plane | ∞ | | | | |

Aspherical surface data

Eleventh surface

K = −3.31784e+001  A4 = 4.85819e−007  A6 = 3.51789e−010
A8 = −1.68716e−012  A10 = 3.64808e−015  A12 = −3.07339e−018

Twenty-third surface

K = 0.00000e+000  A4 = 5.84293e−007  A6 = −4.01038e−010
A8 = 6.53077e−014  A10 = −3.78907e−017  A12 = 1.56357e−020

Twenty-eighth surface

K = 0.00000e+000  A4 = 1.11803e−006  A6 = 5.84301e−010
A8 = 6.92895e−014  A10 = −1.10530e−016  A12 = 1.45955e−019

(Numerical Embodiment 4)
Unit mm

Various data
Zoom ratio 90.00

| | Wide angle | Intermediate | Telephoto |
|---|---|---|---|
| Focal length | 8.70 | 300.95 | 783.00 |
| F-number | 1.84 | 1.85 | 4.00 |
| Half angle of field | 32.30 | 1.05 | 0.40 |
| Image height | 5.50 | 5.50 | 5.50 |
| Total lens length | 604.91 | 604.91 | 604.91 |
| BF | 10.00 | 10.00 | 10.00 |
| d10 | 2.78 | 179.48 | 188.78 |
| d18 | 275.80 | 51.99 | 7.27 |
| d28 | 5.00 | 47.27 | 69.41 |
| d31 | 5.75 | 10.60 | 23.87 |
| Incident pupil position | 125.96 | 3171.15 | 12334.51 |
| Exit pupil position | −2890.36 | −2890.36 | −2890.36 |
| Front principal point position | 134.63 | 3440.87 | 12906.13 |
| Rear principal point position | 1.30 | −290.95 | −773.00 |
| β1 | 0.00 | 0.00 | 0.00 |
| β2 | −0.13 | −1.22 | −2.12 |
| β3 | −0.24 | −0.90 | −1.27 |
| β4 | 2.65 | 2.71 | 2.88 |
| β5 | 0.40 | 0.40 | 0.40 |

Zoom lens unit data

| Unit | First surface | Focal length | Lens structure length | Front principal point position | Rear principal point position |
|---|---|---|---|---|---|
| 1 | 1 | 250.00 | 113.73 | 63.84 | −20.29 |
| 2 | 11 | −26.50 | 22.30 | 1.93 | −15.02 |
| 3 | 19 | 65.00 | 43.30 | 11.18 | −20.52 |
| 4 | 29 | −80.00 | 6.61 | 5.48 | 1.75 |
| 5 | 32 | 52.11 | 119.63 | 51.18 | −21.06 |

Single lens data

| Lens | First surface | Focal length |
|---|---|---|
| 1 | 1 | −463.64 |
| 2 | 3 | 563.56 |
| 3 | 5 | 569.53 |
| 4 | 7 | 826.40 |
| 5 | 9 | 763.88 |
| 6 | 11 | −35.56 |
| 7 | 13 | −42.67 |
| 8 | 15 | 53.60 |
| 9 | 17 | −208.30 |
| 10 | 19 | 137.04 |
| 11 | 21 | −629.61 |
| 12 | 22 | 165.56 |
| 13 | 24 | −181.63 |
| 14 | 25 | 171.96 |
| 15 | 27 | 193.53 |
| 16 | 29 | 68.68 |
| 17 | 30 | −36.03 |
| 18 | 33 | −123.01 |
| 19 | 35 | 79.73 |
| 20 | 37 | −49.28 |
| 21 | 39 | 64.69 |
| 22 | 40 | −59.66 |
| 23 | 42 | 108.59 |
| 24 | 44 | 138.60 |
| 25 | 46 | −50.95 |
| 26 | 47 | 57.76 |
| 27 | 49 | 65.65 |
| 28 | 50 | −80.63 |
| 29 | 52 | 89.79 |

(Numerical Embodiment 4)
Unit mm

| | | |
|---|---|---|
| 30 | 54 | 0.00 |
| 31 | 55 | 0.00 |

(Numerical Embodiment 5)
Unit mm

Surface data

| Surface number | r | d | nd | vd | Effective diameter |
|---|---|---|---|---|---|
| 1 | 3977.133 | 6.00 | 1.83400 | 37.2 | 195.37 |
| 2 | 346.254 | 2.00 | | | 194.94 |
| 3 | 346.530 | 23.00 | 1.43387 | 95.1 | 195.97 |
| 4 | −893.949 | 24.05 | | | 196.45 |
| 5 | 382.400 | 24.00 | 1.43387 | 95.1 | 200.78 |
| 6 | −694.807 | 0.10 | | | 200.46 |
| 7 | 244.452 | 17.00 | 1.43387 | 95.1 | 193.19 |
| 8 | 794.833 | 1.03 | | | 191.90 |
| 9 | 175.228 | 15.50 | 1.49700 | 81.5 | 181.10 |
| 10 | 326.122 | (Variable) | | | 179.01 |
| 11* | −26376.987 | 2.20 | 2.00069 | 25.5 | 44.78 |
| 12 | 41.982 | 10.00 | | | 39.06 |
| 13 | −43.092 | 1.45 | 1.88300 | 40.8 | 38.69 |
| 14 | −194.801 | 1.21 | | | 39.59 |
| 15 | −4335.171 | 7.33 | 1.95906 | 17.5 | 39.92 |
| 16 | −43.834 | 2.50 | 1.77250 | 49.6 | 40.62 |
| 17 | 4376.688 | (Variable) | | | 43.00 |
| 18 | 84.472 | 12.87 | 1.43875 | 94.9 | 74.77 |
| 19 | −330.088 | 0.10 | | | 74.89 |
| 20 | 90.194 | 11.23 | 1.43875 | 94.9 | 74.76 |
| 21* | −1114.043 | 0.10 | | | 74.00 |
| 22 | 118.465 | 2.00 | 1.84666 | 23.8 | 71.45 |
| 23 | 68.366 | 12.65 | 1.43875 | 94.9 | 68.51 |
| 24 | −404.695 | 1.00 | | | 67.80 |
| 25 | 277.223 | 5.29 | 1.49700 | 81.5 | 65.21 |
| 26* | −467.172 | (Variable) | | | 63.57 |
| 27 | −257.714 | 2.00 | 1.43875 | 94.9 | 39.39 |
| 28 | 66.535 | (Variable) | | | 37.14 |
| 29 (Stop) | ∞ | 5.00 | | | 27.92 |
| 30 | −101.536 | 1.50 | 1.88300 | 40.8 | 26.48 |
| 31 | 102.155 | 0.25 | | | 26.30 |
| 32 | 37.053 | 3.66 | 1.84666 | 23.8 | 26.54 |
| 33 | 295.062 | 6.67 | | | 26.12 |
| 34 | −57.652 | 1.60 | 1.85026 | 32.3 | 23.80 |
| 35 | 125.994 | 1.50 | | | 23.67 |
| 36 | −109.652 | 3.83 | 1.84666 | 23.8 | 23.70 |
| 37 | −27.080 | 1.60 | 1.78590 | 44.2 | 23.95 |
| 38 | −305.858 | 1.00 | | | 24.45 |
| 39 | ∞ | 15.22 | 1.67003 | 47.2 | 24.64 |
| 40 | 177.401 | 3.50 | | | 26.07 |
| 41 | −1985.195 | 4.23 | 1.48749 | 70.2 | 26.83 |
| 42 | −41.691 | 0.70 | | | 27.18 |
| 43 | 910.578 | 1.55 | 1.80000 | 29.8 | 26.95 |
| 44 | 40.827 | 5.76 | 1.48749 | 70.2 | 26.74 |
| 45 | −61.926 | 0.20 | | | 26.91 |
| 46 | 69.105 | 4.68 | 1.48749 | 70.2 | 26.62 |
| 47 | −64.619 | 1.62 | 1.88300 | 40.8 | 26.23 |
| 48 | −214.779 | 0.20 | | | 26.07 |
| 49 | 61.187 | 4.06 | 1.48749 | 70.2 | 25.62 |
| 50 | −116.896 | 5.00 | | | 25.07 |
| 51 | ∞ | 33.00 | 1.60859 | 46.4 | 60.00 |
| 52 | ∞ | 13.20 | 1.51633 | 64.2 | 60.00 |
| 53 | ∞ | 10.00 | | | 60.00 |
| Image plane | ∞ | | | | |

(Numerical Embodiment 5)
Unit mm

Aspherical surface data

Eleventh surface

K = 9.19498e−008  A4 = 6.70476e−007  A6 = −1.43152e−010
A8 = −2.22365e−013  A10 = 5.51501e−016  A12 = −3.86383e−019

Twenty-first surface

K = 0.00000e+000  A4 = 2.34245e−007  A6 = −1.60400e−010
A8 = 5.93069e−014  A10 = −7.64404e−018  A12 = 1.22988e−021

Twenty-sixth surface

K = 0.00000e+000  A4 = 9.12260e−007  A6 = 2.61217e−010
A8 = −3.41702e−014  A10 = 3.66918e−017  A12 = −1.30386e−020

Various data
Zoom ratio 90.00

| | Wide angle | Intermediate | Telephoto |
|---|---|---|---|
| Focal length | 8.90 | 350.20 | 801.00 |
| F-number | 1.90 | 1.90 | 4.10 |
| Half angle of field | 31.72 | 0.90 | 0.39 |
| Image height | 5.50 | 5.50 | 5.50 |
| Total lens length | 603.90 | 603.90 | 603.90 |
| BF | 10.00 | 10.00 | 10.00 |
| d10 | 2.00 | 180.19 | 187.83 |
| d17 | 275.59 | 46.48 | 8.18 |
| d26 | 8.46 | 51.22 | 67.81 |
| d28 | 3.72 | 11.88 | 25.94 |
| Incident pupil position | 125.21 | 3626.98 | 11817.53 |
| Exit pupil position | 1272.78 | 1272.78 | 1272.78 |
| Front principal point position | 134.17 | 4074.31 | 13126.61 |
| Rear principal point position | 1.10 | −340.20 | −791.00 |
| β1 | 0.00 | 0.00 | 0.00 |
| β2 | −0.13 | −1.30 | −2.09 |
| β3 | −0.24 | −0.94 | −1.26 |
| β4 | 1.71 | 1.78 | 1.90 |
| β5 | 0.64 | 0.64 | 0.64 |

Zoom lens unit data

| Unit | First surface | Focal length | Lens structure length | Front principal point position | Rear principal point position |
|---|---|---|---|---|---|
| 1 | 1 | 250.00 | 112.68 | 63.08 | −19.57 |
| 2 | 11 | −26.50 | 24.69 | 3.43 | −14.55 |
| 3 | 18 | 65.00 | 45.24 | 11.86 | −21.44 |
| 4 | 27 | −120.00 | 2.00 | 1.10 | −0.28 |
| 5 | 29 | 50.68 | 119.53 | 52.77 | −8.21 |

Single lens data

| Lens | First surface | Focal length |
|---|---|---|
| 1 | 1 | −452.22 |
| 2 | 3 | 577.38 |
| 3 | 5 | 570.92 |
| 4 | 7 | 804.10 |
| 5 | 9 | 734.67 |
| 6 | 11 | −41.50 |
| 7 | 13 | −62.58 |
| 8 | 15 | 45.52 |
| 9 | 16 | −55.90 |
| 10 | 18 | 154.38 |
| 11 | 20 | 190.24 |
| 12 | 22 | −192.61 |
| 13 | 23 | 134.06 |
| 14 | 25 | 349.87 |
| 15 | 27 | −120.00 |
| 16 | 30 | −57.14 |

(Numerical Embodiment 5)
Unit mm

| | | |
|---|---|---|
| 17 | 32 | 49.24 |
| 18 | 34 | −46.00 |
| 19 | 36 | 41.18 |
| 20 | 37 | −37.70 |
| 21 | 39 | −263.44 |
| 22 | 41 | 87.00 |
| 23 | 43 | −53.05 |
| 24 | 44 | 51.25 |
| 25 | 46 | 69.06 |
| 26 | 47 | −104.60 |
| 27 | 49 | 82.73 |
| 28 | 51 | 0.00 |
| 29 | 52 | 0.00 |

(Numerical Embodiment 6)
Unit mm

Surface data

| Surface number | r | d | nd | vd | Effective diameter |
|---|---|---|---|---|---|
| 1 | 14339.614 | 6.00 | 1.83400 | 37.2 | 203.30 |
| 2 | 352.279 | 2.00 | | | 196.61 |
| 3 | 371.866 | 23.00 | 1.43387 | 95.1 | 196.87 |
| 4 | −722.314 | 24.39 | | | 197.48 |
| 5 | 345.112 | 22.70 | 1.43387 | 95.1 | 202.11 |
| 6 | −1283.072 | 0.10 | | | 201.74 |
| 7 | 255.740 | 19.60 | 1.43387 | 95.1 | 197.51 |
| 8 | 1957.305 | 1.65 | | | 196.71 |
| 9 | 194.644 | 14.90 | 1.49700 | 81.5 | 186.23 |
| 10 | 402.006 | (Variable) | | | 184.92 |
| 11* | −492.188 | 2.20 | 2.00330 | 28.3 | 50.13 |
| 12 | 61.508 | 10.55 | | | 44.56 |
| 13 | −56.711 | 1.45 | 1.81600 | 46.6 | 42.52 |
| 14 | 96.272 | 1.22 | | | 42.10 |
| 15 | 149.061 | 6.42 | 1.95906 | 17.5 | 42.21 |
| 16 | −70.403 | 1.84 | 1.69680 | 55.5 | 42.20 |
| 17 | 193.123 | (Variable) | | | 41.55 |
| 18* | 80.853 | 14.55 | 1.43875 | 94.9 | 73.75 |
| 19 | −306.449 | 0.50 | | | 73.79 |
| 20 | 64.055 | 16.08 | 1.49700 | 81.5 | 72.55 |
| 21 | −806.468 | 0.65 | | | 70.56 |
| 22 | 228.707 | 2.00 | 1.84666 | 23.8 | 67.33 |
| 23 | 76.840 | 1.88 | | | 63.67 |
| 24 | 73.646 | 10.87 | 1.49700 | 81.5 | 63.06 |
| 25* | −180.095 | (Variable) | | | 61.62 |
| 26 | 389.976 | 1.65 | 1.77250 | 49.6 | 44.14 |
| 27 | 70.589 | 3.72 | 1.80809 | 22.8 | 42.34 |
| 28 | 107.240 | (Variable) | | | 41.29 |
| 29 (Stop) | ∞ | 5.00 | | | 26.65 |
| 30 | −98.456 | 1.40 | 1.88300 | 40.8 | 24.61 |
| 31 | 67.240 | 4.67 | 1.80809 | 22.8 | 24.20 |
| 32 | −110.668 | 2.00 | | | 23.85 |
| 33 | −95.143 | 1.40 | 1.88300 | 40.8 | 23.07 |
| 34 | 172.908 | 8.95 | | | 22.84 |
| 35 | 2745.243 | 1.50 | 1.72916 | 54.7 | 22.37 |
| 36 | 26.793 | 3.77 | 1.80518 | 25.4 | 22.23 |
| 37 | 56.558 | 4.21 | | | 22.05 |
| 38 | −36.578 | 8.80 | 1.65844 | 50.9 | 22.31 |
| 39 | −57.099 | 7.00 | | | 25.65 |
| 40 | 80.622 | 5.83 | 1.51823 | 58.9 | 28.62 |
| 41 | −61.345 | 0.22 | | | 28.83 |
| 42 | 90.465 | 1.50 | 1.83400 | 37.2 | 28.65 |
| 43 | 27.509 | 6.03 | 1.51633 | 64.1 | 28.16 |
| 44 | −4129.142 | 1.71 | | | 28.40 |
| 45 | −244.738 | 6.69 | 1.51633 | 64.1 | 28.62 |
| 46 | −28.872 | 1.50 | 1.85026 | 32.3 | 29.10 |
| 47 | −59.503 | 0.20 | | | 30.24 |
| 48 | 61.470 | 5.34 | 1.51633 | 64.1 | 30.90 |
| 49 | −59.836 | 8.00 | | | 30.80 |
| 50 | ∞ | 33.00 | 1.60859 | 46.4 | 50.00 |
| 51 | ∞ | 13.20 | 1.51633 | 64.2 | 50.00 |
| 52 | ∞ | 10.16 | | | 50.00 |
| Image plane | ∞ | | | | |

Aspherical surface data

Eleventh surface

K = −2.39205e−009  A4 = 1.04812e−006  A6 = 4.56753e−010
A8 = −2.01813e−012  A10 = 4.03875e−015  A12 = −2.90787e−018

Eighteenth surface

K = 0.00000e+000  A4 = −2.28878e−007  A6 = 2.45145e−010
A8 = −5.53365e−014  A10 = −3.29084e−017  A12 = 1.64246e−020

Twenty-fifth surface

K = 0.00000e+000  A4 = 1.59503e−006  A6 = 5.92000e−010
A8 = −4.88630e−013  A10 = 2.13357e−016  A12 = 3.16910e−021

Various data
Zoom ratio 100.00

| | Wide angle | Intermediate | Telephoto |
|---|---|---|---|
| Focal length | 8.60 | 329.41 | 860.00 |
| F-number | 1.95 | 1.95 | 4.40 |
| Half angle of field | 32.60 | 0.96 | 0.37 |
| Image height | 5.50 | 5.50 | 5.50 |
| Total lens length | 629.60 | 629.60 | 629.60 |
| BF | 10.16 | 10.16 | 10.16 |
| d10 | 1.80 | 179.99 | 187.80 |
| d17 | 286.34 | 57.49 | 10.59 |
| d25 | 4.05 | 23.25 | 34.99 |
| d28 | 5.42 | 36.88 | 64.22 |
| Incident pupil position | 128.13 | 3602.51 | 13882.51 |
| Exit pupil position | 134.70 | 134.70 | 134.70 |
| Front principal point position | 137.32 | 4803.23 | 20681.14 |
| Rear principal point position | 1.56 | −319.26 | −849.84 |
| β1 | 0.00 | 0.00 | 0.00 |
| β2 | −0.13 | −1.30 | −2.12 |
| β3 | −0.23 | −0.80 | −1.17 |
| β4 | 1.30 | 1.46 | 1.60 |
| β5 | 0.87 | 0.87 | 0.87 |

Zoom lens unit data

| Unit | First surface | Focal length | Lens structure length | Front principal point position | Rear principal point position |
|---|---|---|---|---|---|
| 1 | 1 | 250.00 | 114.34 | 65.93 | −17.78 |
| 2 | 11 | −26.50 | 23.68 | 5.42 | −11.70 |
| 3 | 18 | 63.00 | 46.53 | 11.96 | −22.53 |
| 4 | 26 | −200.00 | 5.37 | 4.43 | 1.42 |
| 5 | 29 | 36.50 | 131.92 | 50.87 | 5.44 |

Single lens data

| Lens | First surface | Focal length |
|---|---|---|
| 1 | 1 | −430.37 |
| 2 | 3 | 568.00 |
| 3 | 5 | 627.91 |
| 4 | 7 | 673.98 |
| 5 | 9 | 739.37 |
| 6 | 11 | −53.94 |
| 7 | 13 | −43.33 |
| 8 | 15 | 49.92 |
| 9 | 16 | −73.52 |
| 10 | 18 | 147.13 |
| 11 | 20 | 119.79 |
| 12 | 22 | −136.16 |
| 13 | 24 | 106.38 |

(Numerical Embodiment 6)
Unit mm

| | | |
|---|---|---|
| 14 | 26 | −111.29 |
| 15 | 27 | 241.94 |
| 16 | 30 | −44.81 |
| 17 | 31 | 51.84 |
| 18 | 33 | −68.93 |
| 19 | 35 | −36.96 |
| 20 | 36 | 59.28 |
| 21 | 38 | −185.53 |
| 22 | 40 | 67.91 |
| 23 | 42 | −47.61 |
| 24 | 43 | 52.75 |
| 25 | 45 | 62.50 |
| 26 | 46 | −67.00 |
| 27 | 48 | 59.40 |
| 28 | 50 | 0.00 |
| 29 | 51 | 0.00 |

(Numerical Embodiment 7)
Unit mm

Surface data

| Surface number | r | d | nd | vd | Effective diameter |
|---|---|---|---|---|---|
| 1 | 5388.858 | 6.00 | 1.83400 | 37.2 | 203.46 |
| 2 | 361.840 | 2.00 | | | 196.41 |
| 3 | 371.231 | 22.50 | 1.43387 | 95.1 | 196.06 |
| 4 | −824.986 | 25.00 | | | 194.99 |
| 5 | 384.524 | 22.00 | 1.43387 | 95.1 | 198.35 |
| 6 | −840.496 | 0.10 | | | 198.06 |
| 7 | 239.167 | 19.30 | 1.43387 | 95.1 | 191.82 |
| 8 | 1353.558 | 0.80 | | | 190.72 |
| 9 | 182.171 | 14.20 | 1.49700 | 81.5 | 179.07 |
| 10 | 316.904 | (Variable) | | | 176.69 |
| 11* | 4437.099 | 2.20 | 2.00330 | 28.3 | 48.25 |
| 12 | 48.677 | 10.60 | | | 42.14 |
| 13 | −48.411 | 1.45 | 1.81600 | 46.6 | 41.06 |
| 14 | 115.194 | 1.44 | | | 41.26 |
| 15 | 159.497 | 6.10 | 1.95906 | 17.5 | 41.59 |
| 16 | −81.093 | 1.80 | 1.69680 | 55.5 | 41.68 |
| 17 | 1779.699 | (Variable) | | | 41.53 |
| 18* | 76.480 | 12.72 | 1.49700 | 81.5 | 73.13 |
| 19 | −454.515 | 0.10 | | | 73.09 |
| 20 | 127.485 | 9.84 | 1.49700 | 81.5 | 72.36 |
| 21 | −253.156 | 0.20 | | | 71.82 |
| 22 | 163.064 | 9.22 | 1.49700 | 81.5 | 68.21 |
| 23 | −170.042 | 2.20 | 1.84666 | 23.8 | 67.02 |
| 24 | 453.064 | 0.50 | | | 64.82 |
| 25 | 139.034 | 6.08 | 1.49700 | 81.5 | 63.35 |
| 26* | −241.672 | (Variable) | | | 62.40 |
| 27 | 684.417 | 1.40 | 1.88300 | 40.8 | 34.33 |
| 28 | 64.502 | 3.83 | 1.80518 | 25.4 | 33.12 |
| 29 | 158.269 | (Variable) | | | 32.25 |
| 30 (Stop) | ∞ | 5.00 | | | 22.61 |
| 31 | −44.446 | 1.61 | 1.88300 | 40.8 | 20.81 |
| 32 | 42.278 | 3.97 | 1.80809 | 22.8 | 20.75 |
| 33 | −76.368 | 3.39 | | | 20.77 |
| 34 | −55.937 | 1.80 | 1.88300 | 40.8 | 20.08 |
| 35 | 246.197 | 5.95 | | | 20.25 |
| 36 | −107.957 | 1.50 | 1.72916 | 54.7 | 21.23 |
| 37 | 88.134 | 2.77 | 1.80518 | 25.4 | 21.74 |
| 38 | 576.671 | 2.21 | | | 22.12 |
| 39 | 245.500 | 14.20 | 1.62041 | 60.3 | 22.94 |
| 40 | −208.704 | 5.51 | | | 25.31 |
| 41 | 106.999 | 5.23 | 1.51823 | 58.9 | 26.70 |
| 42 | −43.267 | 0.45 | | | 26.81 |
| 43 | −1445.961 | 1.50 | 1.83400 | 37.2 | 26.42 |
| 44 | 32.572 | 5.78 | 1.51633 | 64.1 | 26.31 |
| 45 | −80.307 | 1.15 | | | 26.61 |
| 46 | 215.901 | 5.52 | 1.48749 | 70.2 | 26.80 |
| 47 | −32.515 | 1.50 | 1.83400 | 37.2 | 26.81 |
| 48 | −58.122 | 0.25 | | | 27.30 |
| 49 | 76.551 | 4.34 | 1.48749 | 70.2 | 27.04 |
| 50 | −120.000 | 5.00 | | | 26.63 |
| 51 | ∞ | 33.00 | 1.60859 | 46.4 | 50.00 |
| 52 | ∞ | 13.20 | 1.51633 | 64.2 | 50.00 |
| 53 | ∞ | 7.00 | | | 50.00 |
| Image plane | ∞ | | | | |

Aspherical surface data

Eleventh surface $K = 1.39027e+001$  $A4 = 7.68392e-007$  $A6 = 1.71167e-010$
$A8 = -8.60890e-013$  $A10 = 1.63300e-015$  $A12 = -9.72113e-019$ Eighteenth surface $K = 0.00000e+000$  $A4 = 1.60228e-008$  $A6 = 7.60053e-011$
$A8 = -5.40627e-014$  $A10 = 4.34759e-017$  $A12 = -1.42366e-020$ Twenty-sixth surface $K = 0.00000e+000$  $A4 = 1.43148e-006$  $A6 = 2.24732e-010$
$A8 = -2.53688e-013$  $A10 = 3.43340e-016$  $A12 = -9.73784e-020$ Various data
Zoom ratio 85.00

| | Wide angle | Intermediate | Telephoto |
|---|---|---|---|
| Focal length | 8.40 | 330.10 | 714.00 |
| F-number | 1.91 | 1.91 | 3.70 |
| Half angle of field | 33.22 | 0.95 | 0.44 |
| Image height | 5.50 | 5.50 | 5.50 |
| Total lens length | 596.13 | 596.13 | 596.13 |
| BF | 7.00 | 7.00 | 7.00 |
| d10 | 1.40 | 177.33 | 185.62 |
| d17 | 266.97 | 40.67 | 8.36 |
| d26 | 10.09 | 46.93 | 57.48 |
| d29 | 4.25 | 17.78 | 31.25 |
| Incident pupil position | 125.45 | 3621.55 | 11176.86 |
| Exit pupil position | 133.53 | 133.53 | 133.53 |
| Front principal point position | 134.41 | 4812.82 | 15919.92 |
| Rear principal point position | −1.40 | −323.10 | −707.00 |
| β1 | 0.00 | 0.00 | 0.00 |
| β2 | −0.13 | −1.17 | −1.86 |
| β3 | −0.23 | −0.98 | −1.27 |
| β4 | 1.26 | 1.33 | 1.40 |
| β5 | 0.86 | 0.86 | 0.86 |

Zoom lens unit data

| Unit | First surface | Focal length | Lens structure length | Front principal point position | Rear principal point position |
|---|---|---|---|---|---|
| 1 | 1 | 250.00 | 111.90 | 63.31 | −19.04 |
| 2 | 11 | −26.50 | 23.59 | 4.56 | −13.03 |
| 3 | 18 | 60.00 | 40.86 | 9.99 | −18.80 |
| 4 | 27 | −200.00 | 5.23 | 3.11 | 0.25 |
| 5 | 30 | 32.77 | 124.83 | 43.69 | 2.50 |

Single lens data

| Lens | First surface | Focal length |
|---|---|---|
| 1 | 1 | −462.39 |
| 2 | 3 | 591.99 |
| 3 | 5 | 609.87 |
| 4 | 7 | 664.38 |
| 5 | 9 | 830.51 |
| 6 | 11 | −48.66 |
| 7 | 13 | −41.39 |
| 8 | 15 | 56.02 |
| 9 | 16 | −110.79 |

-continued (Numerical Embodiment 7)
Unit mm

| | | |
|---|---|---|
| 10 | 18 | 132.39 |
| 11 | 20 | 171.58 |
| 12 | 22 | 168.55 |
| 13 | 23 | −144.36 |
| 14 | 25 | 178.01 |
| 15 | 27 | −80.27 |
| 16 | 28 | 131.56 |
| 17 | 31 | −24.19 |
| 18 | 32 | 33.84 |
| 19 | 34 | −51.18 |
| 20 | 36 | −66.04 |
| 21 | 37 | 127.69 |
| 22 | 39 | 183.31 |
| 23 | 41 | 59.92 |
| 24 | 43 | −37.94 |
| 25 | 44 | 45.51 |
| 26 | 46 | 58.20 |
| 27 | 47 | −90.34 |
| 28 | 49 | 96.24 |
| 29 | 51 | 0.00 |
| 30 | 52 | 0.00 |

TABLE 1

| | | Embodiment | | | | | | |
|---|---|---|---|---|---|---|---|---|
| | | 1 | 2 | 3 | 4 | 5 | 6 | 7 |
| z | | 120 | 100 | 97 | 90 | 90 | 100 | 85 |
| fw | | 9.0 | 8.5 | 8.7 | 8.7 | 8.9 | 8.6 | 8.4 |
| β3F | | −0.97 | −0.83 | −0.74 | −0.82 | −0.82 | −0.67 | −0.88 |
| L2w | | 2801.94 | 276.47 | 276.69 | 275.80 | 275.59 | 286.34 | 266.97 |
| L3w | | 4.53 | 5.50 | 1.68 | 5.00 | 8.46 | 4.05 | 10.09 |
| f1 | | 250.00 | 250.00 | 250.00 | 250.00 | 250.00 | 250.00 | 250.00 |
| f2 | | −25.70 | −526.50 | −28.00 | −26.50 | −26.50 | −26.50 | −26.50 |
| f3 | | 66.00 | 65.00 | 65.00 | 65.00 | 65.00 | 63.00 | 60.00 |
| f4 | | −170.00 | −150.00 | −150.00 | −80.00 | −120.00 | −200.00 | −200.00 |
| m2F | | 173.61 | 171.98 | 169.07 | 172.05 | 172.07 | 172.05 | 172.06 |
| m3F | | −47.98 | −40.36 | −33.81 | −38.64 | −38.67 | −33.89 | −42.59 |
| L3F | | 52.38 | 41.60 | 32.66 | 42.21 | 45.26 | 24.18 | 43.10 |
| Conditional Expression (1) | \|β3F\| | 0.97 | 0.83 | 0.74 | 0.82 | 0.82 | 0.67 | 0.88 |
| Conditional Expression (2) | f4/f3 | −2.58 | −2.31 | −2.31 | −1.23 | −1.85 | −3.17 | −3.33 |
| Conditional Expression (3) | L2w/L3w | 62.02 | 50.26 | 164.25 | 55.16 | 32.58 | 70.78 | 26.46 |
| Conditional Expression (4) | f1/f2 | −9.73 | −9.43 | −8.93 | −9.43 | −9.43 | −9.43 | −9.43 |
| Conditional Expression (5) | f2/f3 | −0.39 | −0.41 | −0.43 | −0.41 | −0.41 | −0.42 | −0.44 |
| Conditional Expression (6) | L3w/L3w | 0.09 | 0.13 | 0.05 | 0.12 | 0.19 | 0.17 | 0.23 |
| Conditional Expression (7) | \|m2F/m3F\| | 3.62 | 4.26 | 5.00 | 4.45 | 4.45 | 5.08 | 4.04 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-180896, filed Aug. 17, 2012, which is hereby incorporated by reference herein in its entirety.

What is claimed is:

1. A zoom lens, comprising, in order from an object side to an image side:
a first lens unit having a positive refractive power which does not move for zooming;
a second lens unit having a negative refractive power which moves during zooming;
a third lens unit having the positive refractive power which moves during zooming;
a fourth lens unit having the negative refractive power which moves during zooming; and
a fifth lens unit having the positive refractive power which does not move for zooming,
wherein the following conditional expressions are satisfied:

$$0.6 < |\beta 3F| < 1.0;$$

$$-4.0 < f4/f3 < -1.0; \text{ and}$$

$$20 < L2w/L3w < 300,$$

where β3F is a lateral magnification of the third lens unit at a position at which a lateral magnification of the second lens unit becomes −1; f3 is a focal length of the third lens unit; f4 is a focal length of the fourth lens unit; L2w is a gap between the second lens unit and the third lens unit at a wide angle end; and L3w is a gap between the third lens unit and the fourth lens unit at the wide angle end.

2. A zoom lens according to claim 1, wherein the following conditional expression is satisfied:

$$-11.0 < f1/f2 < -8.0,$$

where f1 is a focal length of the first lens unit, and f2 is a focal length of the second lens unit.

3. A zoom lens according to claim 1, wherein the following conditional expression is satisfied:

$$-0.5 < f2/f3 < -0.3,$$

where f2 is a focal length of the second lens unit.

4. A zoom lens according to claim 1, wherein the following conditional expression is satisfied:

$$-0.01 < L3w/L3F < 1.0,$$

where L3F is a gap between the third lens unit and the fourth lens unit at the position at which the lateral magnification of the second lens unit becomes −1.

5. A zoom lens according to claim 1, wherein the following conditional expression is satisfied:

$$3<|m2F/m3F|<6,$$

where m2F is an amount of movement of the second lens unit at the position at which the lateral magnification of the second lens unit becomes −1, and m3F is an amount of movement of the third lens unit at the position at which the lateral magnification of the second lens unit becomes −1.

6. A zoom lens according to claim 1, wherein the fourth lens unit comprises one of one negative lens and a combination of at least one negative lens and one positive lens.

7. A zoom lens according to claim 1, wherein the following conditional expression is satisfied:

$$Z>80,$$

where Z is a zoom ratio.

8. An image pickup apparatus, comprising:
a zoom lens, comprising, in order from an object side to an image side:
 a first lens unit having a positive refractive power which does not move for zooming;
 a second lens unit having a negative refractive power which moves during zooming;
 a third lens unit having the positive refractive power which moves during zooming;
 a fourth lens unit having the negative refractive power which moves during zooming; and
 a fifth lens unit having the positive refractive power which does not move for zooming,
 wherein the following conditional expressions are satisfied:

$$0.6<|\beta 3F|<1.0;$$

$$-4.0<f4/f3<-1.0;\text{ and}$$

$$20<L2w/L3w<300,$$

where β3F is a lateral magnification of the third lens unit at a position at which a lateral magnification of the second lens unit becomes −1; f3 is a focal length of the third lens unit; f4 is a focal length of the fourth lens unit; L2w is a gap between the second lens unit and the third lens unit at a wide angle end; and L3w is a gap between the third lens unit and the fourth lens unit at the wide angle end; and
a solid state image pickup element for receiving an image formed by the zoom lens.

* * * * *